US011948518B2

(12) United States Patent
Cheng

(10) Patent No.: US 11,948,518 B2
(45) Date of Patent: Apr. 2, 2024

(54) SOURCE DRIVER WITH ADAPTIVE GAMMA DRIVING STRUCTURE

(71) Applicant: NOVATEK Microelectronics Corp., Hsin-Chu (TW)

(72) Inventor: Jhih-Siou Cheng, New Taipei (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/203,651

(22) Filed: May 31, 2023

(65) Prior Publication Data

US 2023/0386415 A1 Nov. 30, 2023

Related U.S. Application Data

(60) Provisional application No. 63/347,028, filed on May 31, 2022.

(51) Int. Cl.
*G09G 3/3291* (2016.01)
*G09G 3/20* (2006.01)

(52) U.S. Cl.
CPC ......... *G09G 3/3291* (2013.01); *G09G 3/2074* (2013.01); *G09G 2300/0452* (2013.01); *G09G 2310/027* (2013.01); *G09G 2320/0626* (2013.01); *G09G 2320/0673* (2013.01); *G09G 2330/028* (2013.01)

(58) Field of Classification Search
CPC .. G09G 3/3258; G09G 3/3275; G09G 3/3291; G09G 3/3607; G09G 3/3614; G09G 3/3685; G09G 2300/0828; G09G 2310/0264; G09G 2310/0291; G09G 3/3688; G09G 3/3696; G09G 2310/027; G09G 2330/028; G09G 3/3648; H03M 1/661; H03M 1/76
See application file for complete search history.

(56) References Cited

U.S. PATENT DOCUMENTS

| | | | | |
|---|---|---|---|---|
| 2009/0213051 A1* | 8/2009 | Tsuchi | ................ | G09G 3/3685 345/87 |
| 2011/0234571 A1* | 9/2011 | Tsuchi | ................ | G09G 3/3696 345/204 |

* cited by examiner

*Primary Examiner* — Nelson M Rosario
(74) *Attorney, Agent, or Firm* — Winston Hsu

(57) ABSTRACT

A source driver includes a first DAC for driving a first-color subpixel and a second DAC for driving a second-color subpixel. Each DAC is configured to output at least one output voltage according to an N-bit data code, and includes a plurality of sub-DACs, an interpolation circuit and a switch circuit. Each sub-DAC receives m bits of the N-bit data code and generates a set of intermediate voltages accordingly. The interpolation circuit performs an interpolation on a selected set of intermediate voltages according to k bits of the N-bit data code and at least one interpolation control signal, to generate the output voltage. The switch circuit electrically connects the interpolation circuit and a selected sub-DAC which outputs the selected set of intermediate voltages. The interpolation circuit of the first DAC and the interpolation circuit of the second DAC respectively perform the interpolation according to different numbers of interpolation bits.

19 Claims, 15 Drawing Sheets

SOURCE DRIVER WITH ADAPTIVE GAMMA DRIVING STRUCTURE

CROSS REFERENCE TO RELATED APPLICATIONS

This application claims the benefit of U.S. Provisional Application No. 63/347,028, filed on May 31, 2022. The content of the application is incorporated herein by reference.

BACKGROUND OF THE INVENTION

1. Field of the Invention

The present invention relates to a source driver, and more particularly, to a source driver for a self-luminous display panel.

2. Description of the Prior Art

In recent years, many display panels on the market apply the light-emitting diode (LED) technology, such as an OLED panel, mini-LED panel, and micro-LED panel. On these panels, different colors are displayed by using LEDs in different colors to emit light. Therefore, appropriate data voltages for the three colors, RGB, should be generated according to different characteristic curves during the process of converting the input grayscale data into data voltages (i.e., which are selected from gamma voltages), to be adapted to their different conversion characteristics. The data voltage ranges suitable for different colors are usually different. In the prior art, it is not easy to use a single gamma voltage generation circuit to generate the data voltages suitable for different colors.

SUMMARY OF THE INVENTION

It is therefore an objective of the present invention to provide a novel source driver, which includes a particular digital-to-analog converter (DAC) structure capable of generating different data voltage ranges for different colors, so as to solve the abovementioned problems.

An embodiment of the present invention discloses a source driver, which comprises a first DAC and a second DAC. The first DAC is in a first driving channel for driving a first-color subpixel and the second DAC is in a second driving channel for driving a second-color subpixel. Each of the first DAC and the second DAC is configured to output at least one output voltage according to an N-bit data code, and each of the first DAC and the second DAC comprises a plurality of sub-DACs, an interpolation circuit and a switch circuit. Each of the plurality of sub-DACs is configured to receive m bits of the N-bit data code and generate a set of intermediate voltages according to the m bits of the N-bit data code. The interpolation circuit is configured to perform an interpolation on a selected set of intermediate voltages according to k bits of the N-bit data code and at least one interpolation control signal, to generate the at least one output voltage. The switch circuit, coupled to the plurality of sub-DACs and the interpolation circuit, is configured to, according to a first select signal and a second select signal, electrically connect the interpolation circuit and a selected sub-DAC among the plurality of sub-DACs which outputs the selected set of intermediate voltages. Wherein, the interpolation circuit of the first DAC and the interpolation circuit of the second DAC respectively perform the interpolation on the respective selected set of intermediate voltages according to different numbers of interpolation bits.

These and other objectives of the present invention will no doubt become obvious to those of ordinary skill in the art after reading the following detailed description of the preferred embodiment that is illustrated in the various figures and drawings.

DETAILED DESCRIPTION

As for a liquid crystal display (LCD) panel, the display driver integrated circuit (IC) generates multiple gamma voltages by using a single gamma voltage generation circuit, where the gamma voltages are selected by each data driving channel to be output to drive the LCD panel. The light source of the LCD panel originates from the backlight and a color filter is applied to form the three colors RGB. Therefore, as for the LCD panel, the display of different colors is from the same light source, and the same gamma voltage generation circuit may be used for driving.

However, as for a self-luminous display panel such as a light-emitting diode (LED) panel or an organic LED (OLED) panel, LEDs/OLEDs in different colors are applied to emit light, and these light emitting devices have different characteristic curves of input grayscales versus data voltages (i.e., which are selected from gamma voltages). The present invention provides a novel design of DACs used in the driving channels for outputting data voltages to the self-luminous display panel, allowing a single gamma voltage generation circuit to be applicable to different conversion characteristics of the LEDs/OLEDs in different colors.

Figure 1:
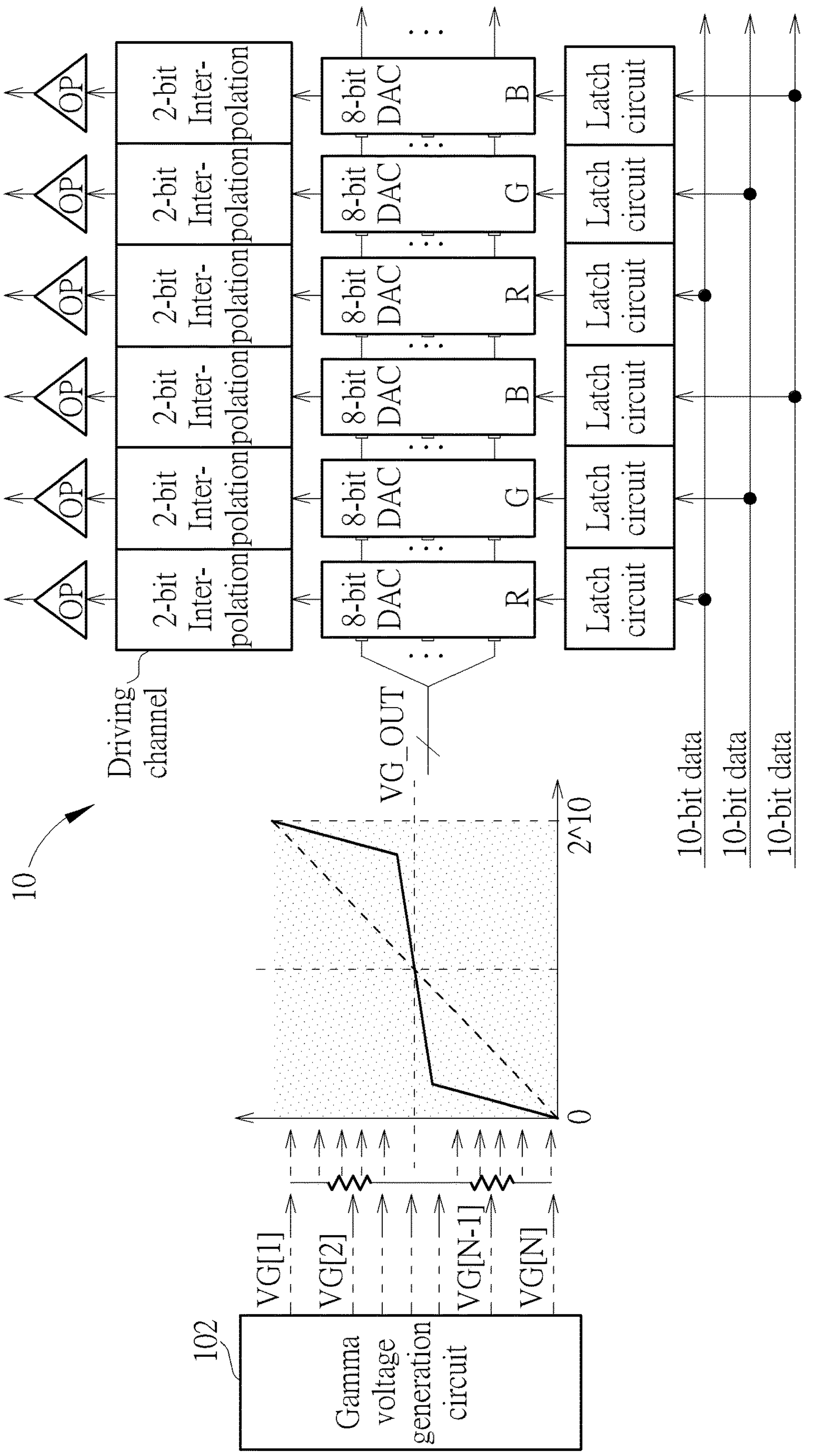
FIG. 1 is a schematic diagram of a source driver.

FIG. 1 is a schematic diagram of a source driver 10. The source driver 10 includes a plurality of driving channels, each having a latch circuit, a digital-to-analog converter (DAC), an interpolation circuit and an operational amplifier (OP). FIG. 1 also illustrates a gamma voltage generation circuit 102, which may be included in the source driver 10 or coupled to the source driver 10. The gamma voltage generation circuit 102 is configured to provide gamma voltages VG_OUT for each driving channel. In this example, the gamma voltage generation circuit 102 generates multiple gamma tap voltages VG[1]-VG[N], which are divided by a resistor string to generate $2^{10}$=1024 gamma voltages VG_OUT to be provided for the DAC of each driving channel in the source driver 10.

Each driving channel may receive a 10-bit input display data (e.g., grayscale value) and store the display data in the latch circuit. The DAC selects two or more gamma voltages from 1024 gamma voltages VG_OUT of the gamma voltage generation circuit 102 to be output to the interpolation circuit according to the higher 8 bits among the 10-bit display data. The interpolation circuit performs interpolation on the selected gamma voltages received from the DAC to obtain an output voltage according to the lowest 2 bits among the 10-bit display data. This output voltage is output to a display panel through the OP, which provides driving capability for driving the target subpixel on the display panel.

The source driver 10 is generally applicable to a LCD panel, where each driving channel is configured to drive subpixels having a specific color R, G or B. In the LCD panel, the data voltage ranges for subpixels of different colors are all the same, and the gamma voltages selected by the DAC based on the display data of different colors under the same grayscale are the same. Therefore, there is no problem to drive the LCD subpixels having different colors based on the same characteristic curve of grayscales versus output voltages.

The left part of FIG. 1 illustrates actual values and ideal values of a grayscale-to-output-voltage curve, where the dotted line shows 1024 gamma voltages generated by the gamma voltage generation circuit 102 actually form a linear relation, and the solid line shows an expected specification of the manufacturers of display devices. The manufacturers of display devices expect that partial gamma voltages (e.g., 256) selected from the 1024 gamma voltages VG_OUT generated by the gamma voltage generation circuit 102 should be able to form the characteristic curve of grayscales versus output voltages illustrated as the solid line. The characteristic curve of this expected specification may correspond to the gamma values expected to be achieved by the display device, such as gamma 2.2 or gamma 1.8.

However, as for an OLED panel (or a medium-size or small-size LED panel such as the mini-LED or micro-LED panel), the OLEDs in each color have individual conversion characteristics with different luminous efficiencies, and thus need different data voltage ranges. In such a situation, it is hard to use a single characteristic curve of grayscale data versus output voltages to be adapted to the brightness variations of OLEDs in different colors. In general, the blue OLEDs have the lowest luminous efficiency and thus need the maximum data voltage range, the red OLEDs are the second, and the green OLEDs have the highest luminous efficiency and thus need the minimum data voltage range.

Note that the OLED devices and OLED subpixels are taken as examples for illustrating the embodiments of the present invention hereinafter, but those skilled in the art should know that the related implementations are also applicable to drive the LED devices and LED subpixels.

Figure 2:
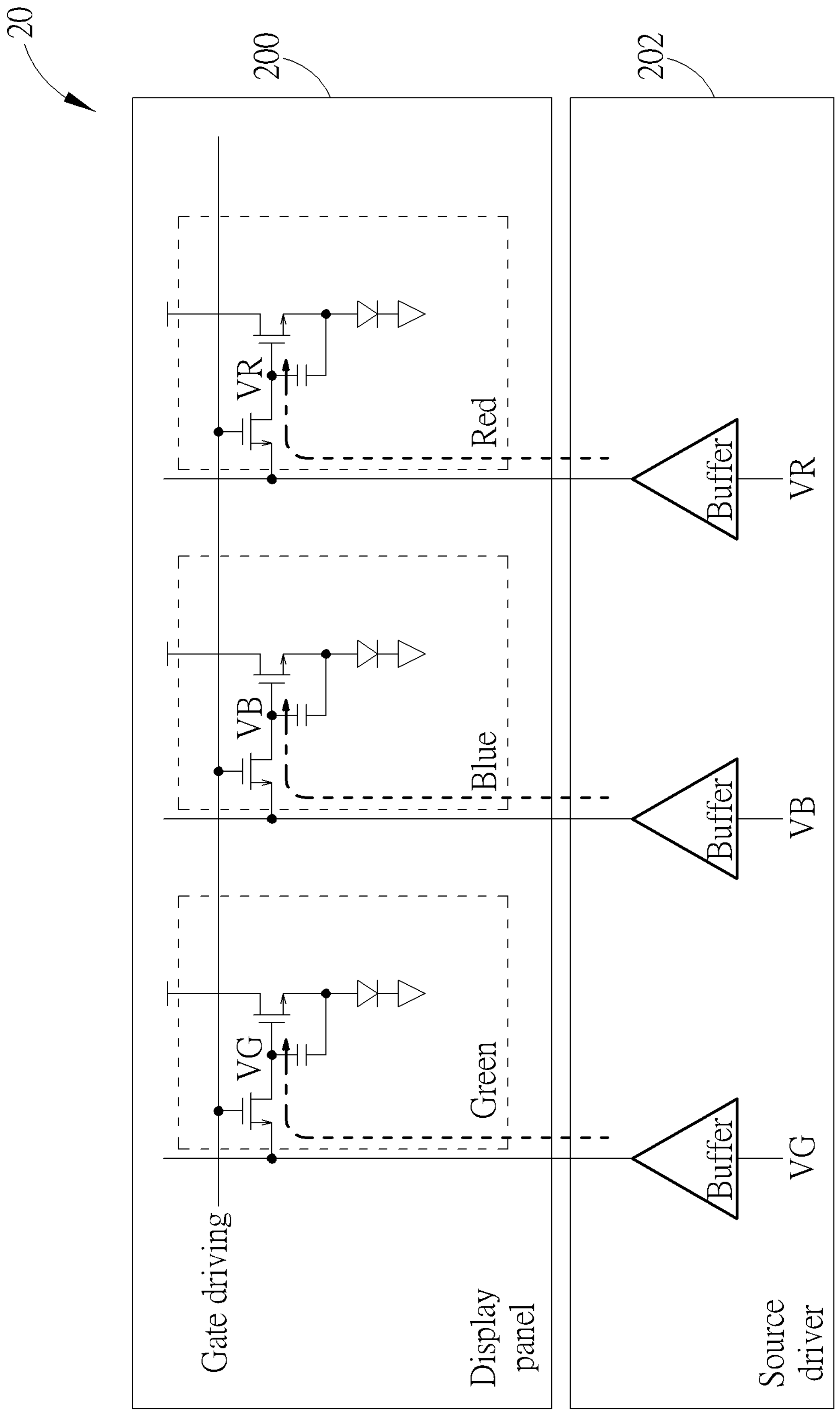
FIG. 2 is a schematic diagram of a display system.

FIG. 2 is a schematic diagram of a display system 20 in which the same gamma voltage generation circuit is used to perform conversion to generate the data voltages for subpixels of different colors. The display system 20 includes a display panel 200 and a source driver 202. Data voltages VG, VB and VR for subpixels of different colors are output through the output buffer in respective driving channels, where the output buffer may be implemented by using the operational amplifier as shown in FIG. 1. The data voltages VG, VB and VR are output to the target subpixels in the display panel 200 as being controlled by the gate driving signal.

FIG. 2 illustrates an oxide-based panel structure that applies a thin-film transistor (TFT) substrate manufactured by using oxide technology, where the transistors in its subpixels for driving the OLEDs are NMOS transistors; hence, if the data voltage VG, VB or VR received by a subpixel is higher, the generated brightness is larger.

Figure 3:
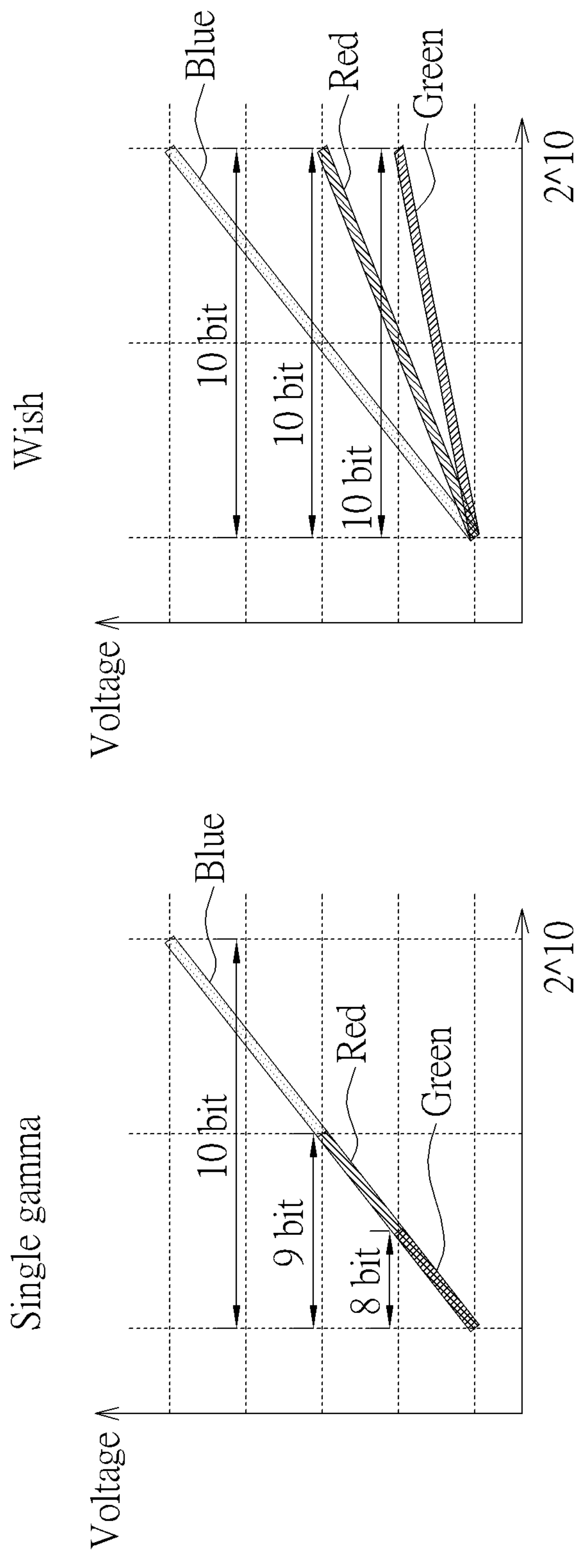
FIG. 3 shows the characteristic curves of input grayscales versus output voltages of the OLEDs in each color.

FIG. 3 shows the characteristic curves of input grayscales versus output voltages of the OLEDs in each color. As shown in FIG. 3, according to the difference of luminous efficiency of the OLEDs in these colors, it can be assumed that the data voltage range of the red OLED is smaller than the data voltage range of the blue OLED and that the data voltage range of the green OLED is smaller than the data voltage range of the red OLED. Since the green OLED has the maximum luminous efficiency, the requested data voltage and driving current for achieving a desired brightness may be the smallest. Since the blue OLED has the minimum luminous efficiency, the requested data voltage and driving current for achieving the desired brightness may be the largest. As for the oxide-based TFT substrate where larger brightness corresponds to a higher data voltage as shown in FIG. 3, the green OLED has the lowest data voltage range and the blue OLED has the highest data voltage range.

In order to realize that each color has an individual characteristic curve of grayscales versus output voltages as expected by the display manufacturers, as the right part of FIG. 3, the display driver circuit wishes to select a predetermined number (e.g., taking 256 as an example hereinafter) among the data voltage range of each color, and is expected to have different sets of 256 gamma voltages selected from $2^{10}$ gamma voltages in the data voltage range to realize different gamma values/curves.

However, the actual situation is as the left part of FIG. 3 under a single gamma implementation, where a single characteristic curve is used for three colors. As for the blue OLED, the data voltage range of the blue OLED covers all of the 1024 (=$2^{10}$) gamma voltages; hence, different sets of 256 gamma voltages may be selected from the candidate pool of 1024 gamma voltages to form different characteristic curves of input grayscales versus output voltages, to realize different gamma values. The data voltage range of the red OLED is smaller than that of the blue OLED, e.g., covers 512 (=$2^9$) gamma voltages only; hence, there are fewer number of sets of 256 gamma voltages selected from the candidate pool of 512 gamma voltages, and the realizable characteristic curves of input grayscales versus output voltages are fewer than those of the blue OLED. The data voltage range of the green OLED is minimum, e.g., covers 256 (=$2^8$) gamma voltages only; hence, selecting 256 gamma voltages from the candidate pool of 256 gamma voltages to form the green characteristic curve of input grayscales versus output voltages is actually equivalent to no selection since there is only one set of 256 gamma voltages. As a result, the brightness variations of red and green that can be shown on the OLED display are fewer, causing a lower image quality.

Figure 4:
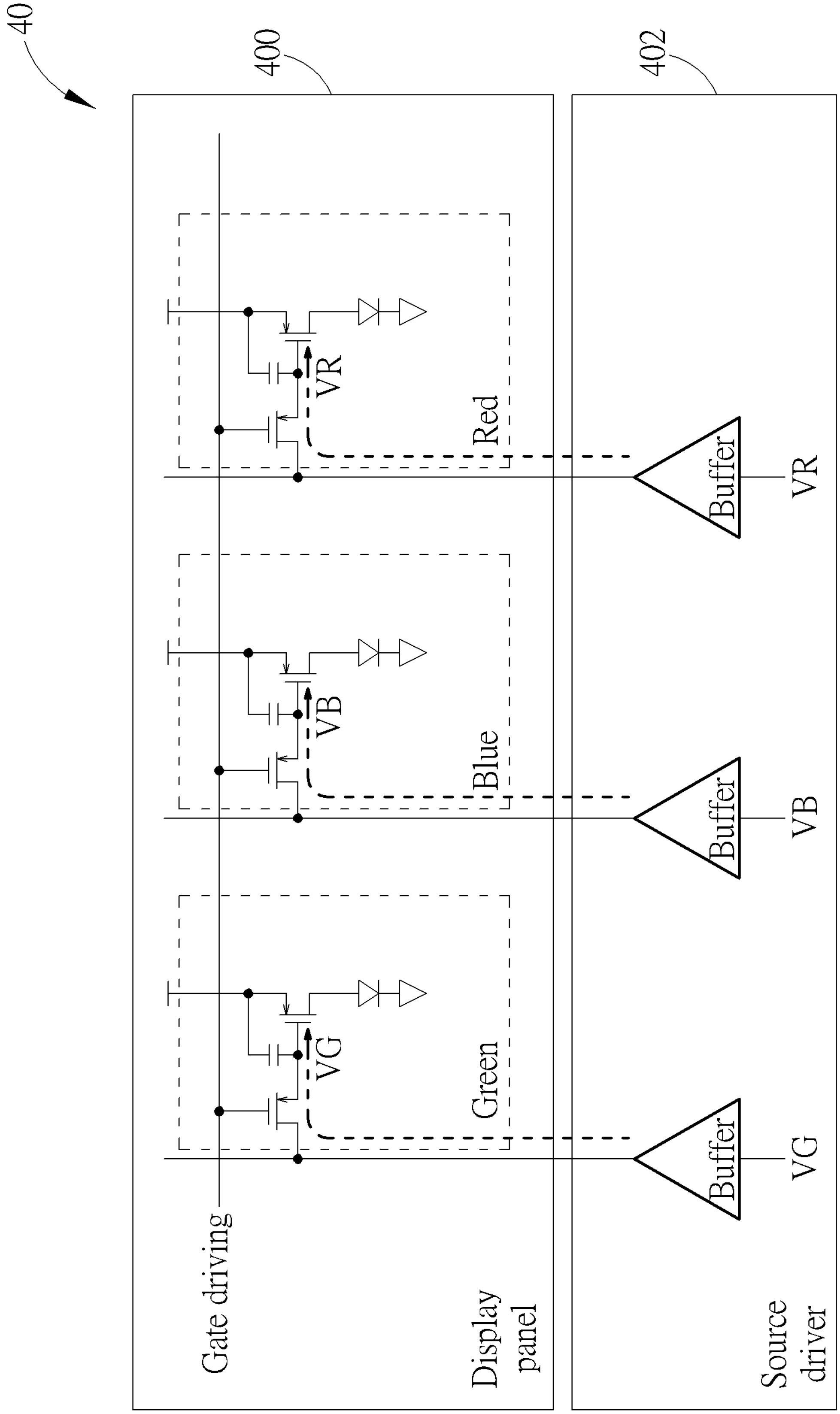
FIG. 4 is a schematic diagram of another display system.

FIG. 4 is a schematic diagram of another display system 40. The display system 40 includes a display panel 400 and a source driver 402. Similarly, data voltages VG, VB and VR for subpixels of different colors are output through the output buffer in respective driving channels, where the output buffer may be implemented by using the operational amplifier as shown in FIG. 1. The data voltages VG, VB and VR are output to the target subpixels in the display panel 400 as being controlled by the gate driving signal.

FIG. 4 illustrates a low-temperature polycrystalline silicon (LTPS) panel structure, where the TFT substrate applies the LTPS technology, and the transistors for driving the OLEDs in the subpixels are PMOS transistors; hence, if the data voltage VG, VB or VR received by a subpixel is lower, the generated brightness is larger.

Figure 5:
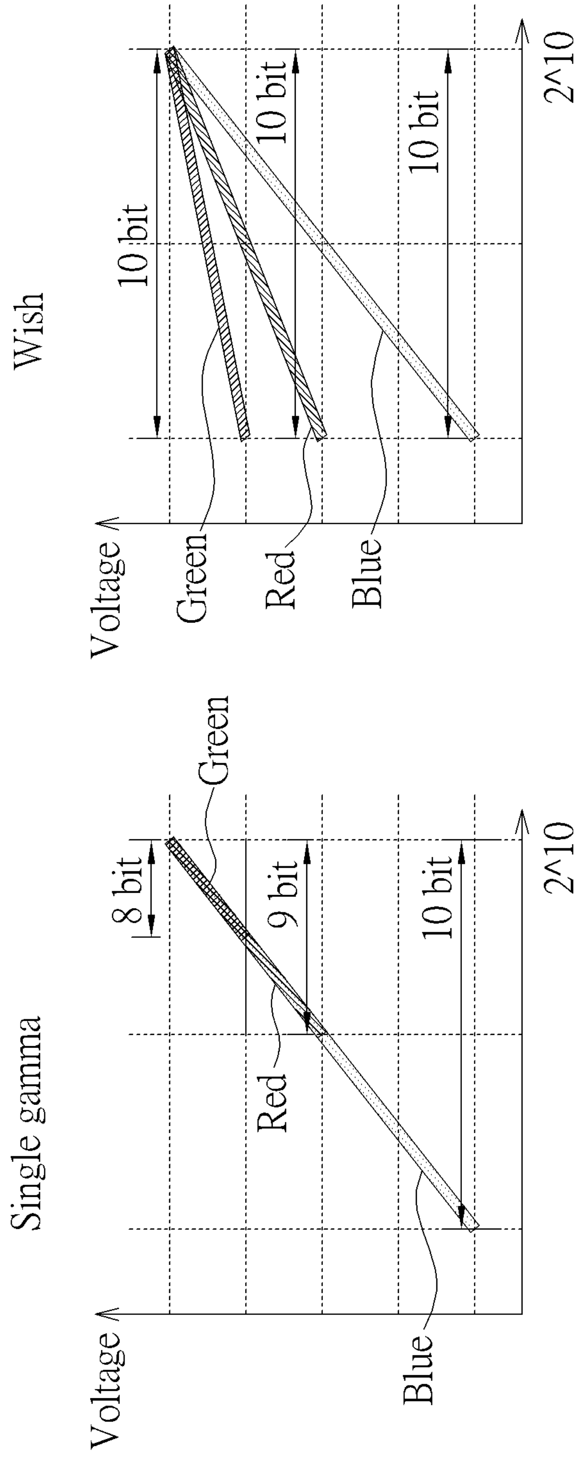
FIG. 5 shows the characteristic curves of input grayscales versus output voltages of the OLEDs in each color in the LIPS panel shown in FIG. 4.

FIG. 5 shows the characteristic curves of input grayscales versus output voltages of the OLEDs in each color in the LTPS panel 400 shown in FIG. 4. The data voltage range of the green OLED is minimum but has the highest voltage level. Therefore, the left figure of FIG. 5 is similar to the left figure of FIG. 3, where the data voltage ranges of the red and green OLEDs are smaller than the data voltage range of the blue OLED. As for the red and green OLEDs, the gamma voltages for forming the characteristic curves of input grayscales versus output voltages as specified can only be selected from a smaller candidate pool of gamma voltages, and thus the realizable characteristic curves are relatively fewer.

Figure 6:
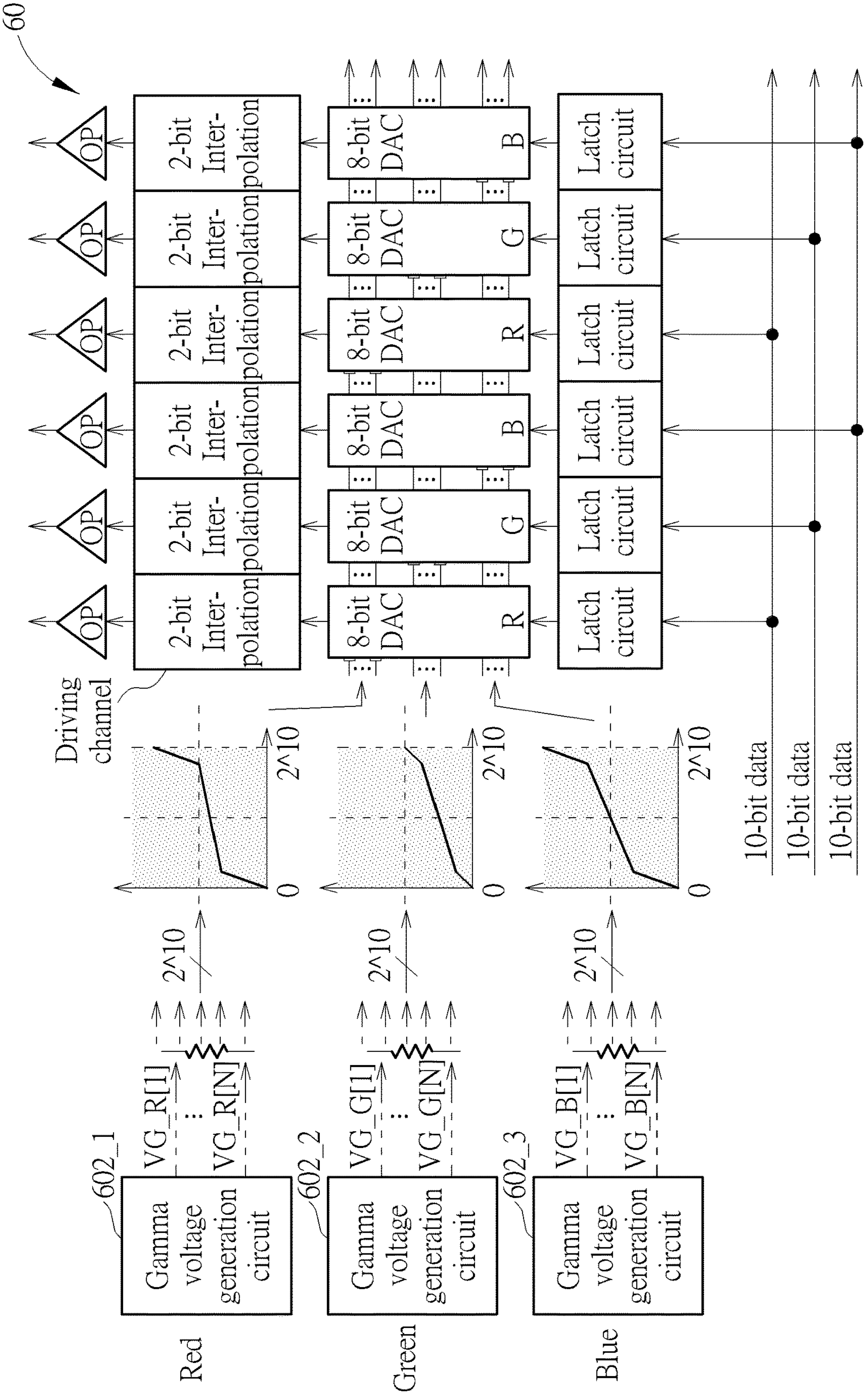
FIG. 6 is a schematic diagram of another source driver.

FIG. 6 is a schematic diagram of another source driver 60. The structure of the source driver 60 is similar to that of the source driver 10 shown in FIG. 1, except that there are multiple gamma voltage generation circuits 602_1-602_3 included in or coupled to the source driver 60. The gamma voltage generation circuits 602_1-602_3 are applied to realize the characteristic curve distributions of input grayscales versus output voltages in different colors, respectively. In this example, the gamma voltage generation circuit 602_1 generates the gamma tap voltages VG_R[1]-VG_R[N] which serve to generate $2^{10}$=1024 gamma voltages to be provided for the DAC of the driving channels for red subpixels. The gamma voltage generation circuit 602_2 generates the gamma tap voltages VG_G[1]-VG_G[N] which serve to generate $2^{10}$=1024 gamma voltages to be provided for the DAC of the driving channels for green subpixels. The gamma voltage generation circuit 602_3 generates the gamma tap voltages VG_B[1]-VG_B[N] which serve to generate $2^{10}$=1024 gamma voltages to be provided for the DAC of the driving channels for blue subpixels.

Therefore, based on the color conversion characteristics of the OLEDs in different colors, each gamma voltage generation circuit 602_1-602_3 may be applied to the respective color RGB for generating 1024 gamma voltages (provided for being selected as data voltages) corresponding to the 10-bit data of each color, under different voltage ranges of different colors. As a result, it will not cause the setting of the green OLED's characteristic curve of input grayscales versus output voltages to be inflexible due to a fewer number of selectable gamma voltages within the data voltage range of the green OLED under the implementation of a single gamma voltage generation circuit. The ideal characteristic curve of input grayscales versus output voltages may be realized in all of the three colors RGB.

However, in the source driver 60 having multiple gamma voltage generation circuits, each of the gamma voltage generation circuits 602_1-602_3 should be connected to the corresponding driving channels through 1024 lines, in order to correspondingly output 1024 different voltage values. These lines need to be deployed through a metal layer stack in the layout to avoid contact with the output channels of other different colors, such that the number of metal layers will increase significantly. Therefore, the usage of three gamma voltage generation circuits 602_1-602_3 will result in a significant increase in system cost and layout complexity.

Therefore, the present invention provides a novel source driver and related DAC design, which may realize the setting flexibility that all the different colors RGB have similar characteristic curves of input grayscales versus output voltages with only one gamma voltage generation circuit rather than three respective gamma voltage generation circuits.

Figure 7:
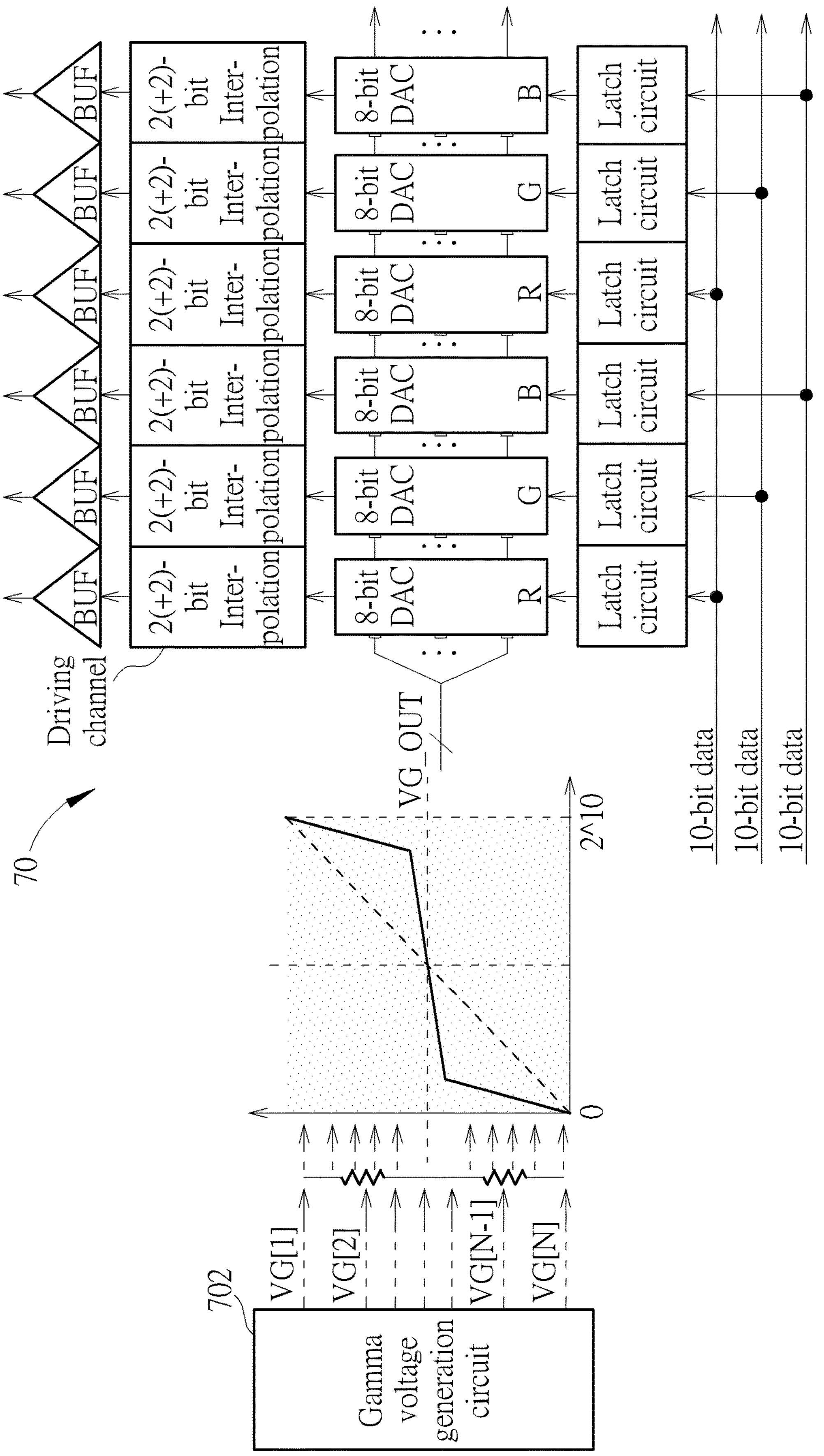
FIG. 7 is a schematic diagram of a source driver according to an embodiment of the present invention.

FIG. 7 is a schematic diagram of a source driver 70 according to an embodiment of the present invention. Similarly, each driving channel of the source driver 70 includes a latch circuit, a DAC, an interpolation circuit and an output buffer BUF. A gamma voltage generation circuit 702, which may be included in the source driver 70 or coupled to the source driver 70, is configured to provide gamma voltages VG_OUT for the source driver 70. More specifically, the gamma voltage generation circuit 702 generates multiple gamma tap voltages VG[1]-VG[N], which are divided by a resistor string to generate the gamma voltages VG_OUT. Each driving channel may output a data voltage based on the received gamma voltages VG_OUT and the display data code.

In this embodiment, the design of an 8-bit DAC along with 2(+2)-bit interpolation may be applied to generate corresponding data voltages according to 10-bit data code, as shown in FIG. 7. For example, as for a blue OLED, an 8-bit DAC along with 2-bit interpolation may be applied to generate the data voltages. As for a red OLED, its data voltage range is approximately one half of the data voltage range of the blue OLED; hence, 7 bits may be used to control the DAC to output the voltages in one half of the range, and (2+1)-bit interpolation is incorporated to realize the 10-bit resolution. As for a green OLED, its data voltage range is approximately one quarter of the data voltage range of the blue OLED; hence, 6 bits may be used to control the DAC to output the voltages in one quarter of the range, and (2+2)-bit interpolation is incorporated to realize the 10-bit resolution. As a result, even in a smaller data voltage range of the red or green OLED, additional interpolation may still be applied to restore the resolution.

Figure 8:
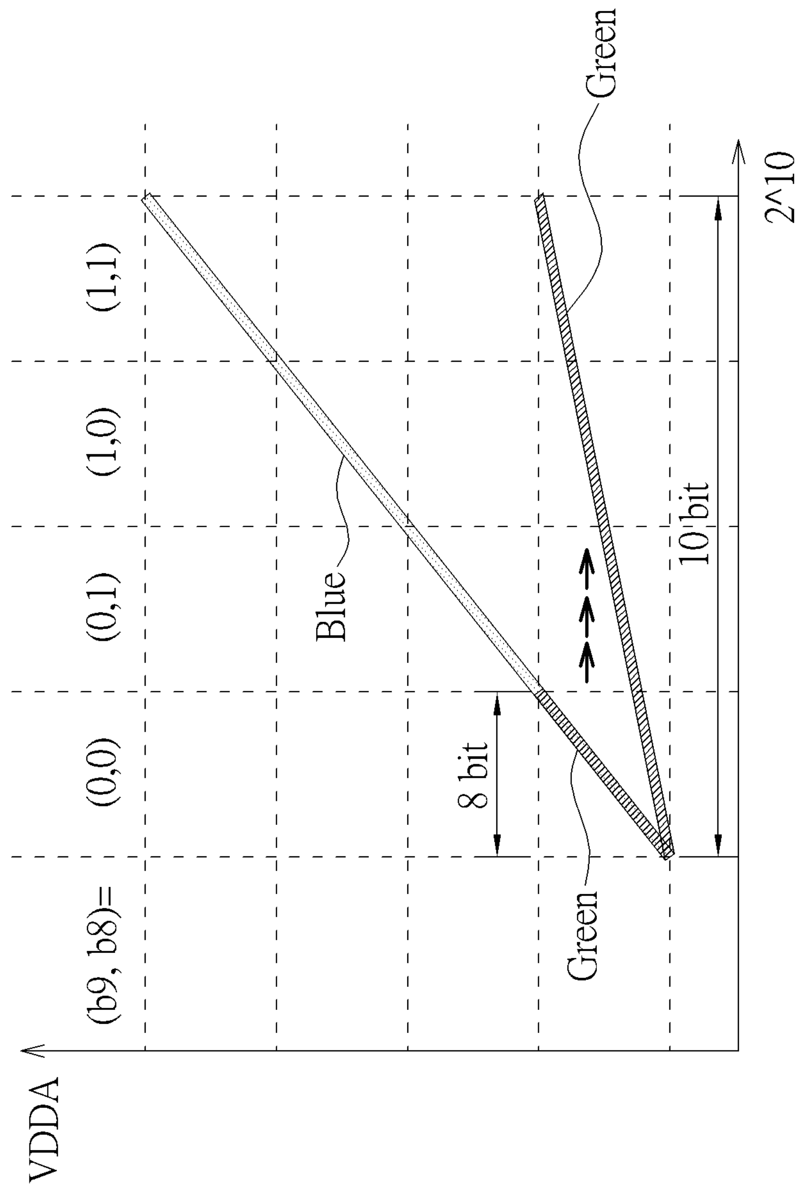
FIG. 8 shows the characteristic curves of input grayscales versus output voltages of a blue OLED and a green OLED.

As shown in FIG. 8, taking the green OLED as an example, its data voltage range may only be one quarter of the data voltage range of the blue OLED; that is, supposing that the data voltage range of the blue OLED equals 0V to VDDA, the data voltage range of the green OLED will equal 0V to ¼×VDDA. Even if (b9,b8) of the green data equal (0,1), (1,0) or (1,1), the selectable gamma voltages will not exceed the corresponding maximum data voltage that is selected based on green data which includes (b9,b8)=(0,0). In other words, although the green data also has 10 bits (e.g., b0-b9), only b0-b7 of the data bit can reflect the selected voltage based on its data value. However, according to the method of the present invention, the bit values may be shifted to increase the bits for interpolation, so the 10-bit data code of the green subpixel may still probably generate different data voltages corresponding to 1024 grayscales.

Figure 9:
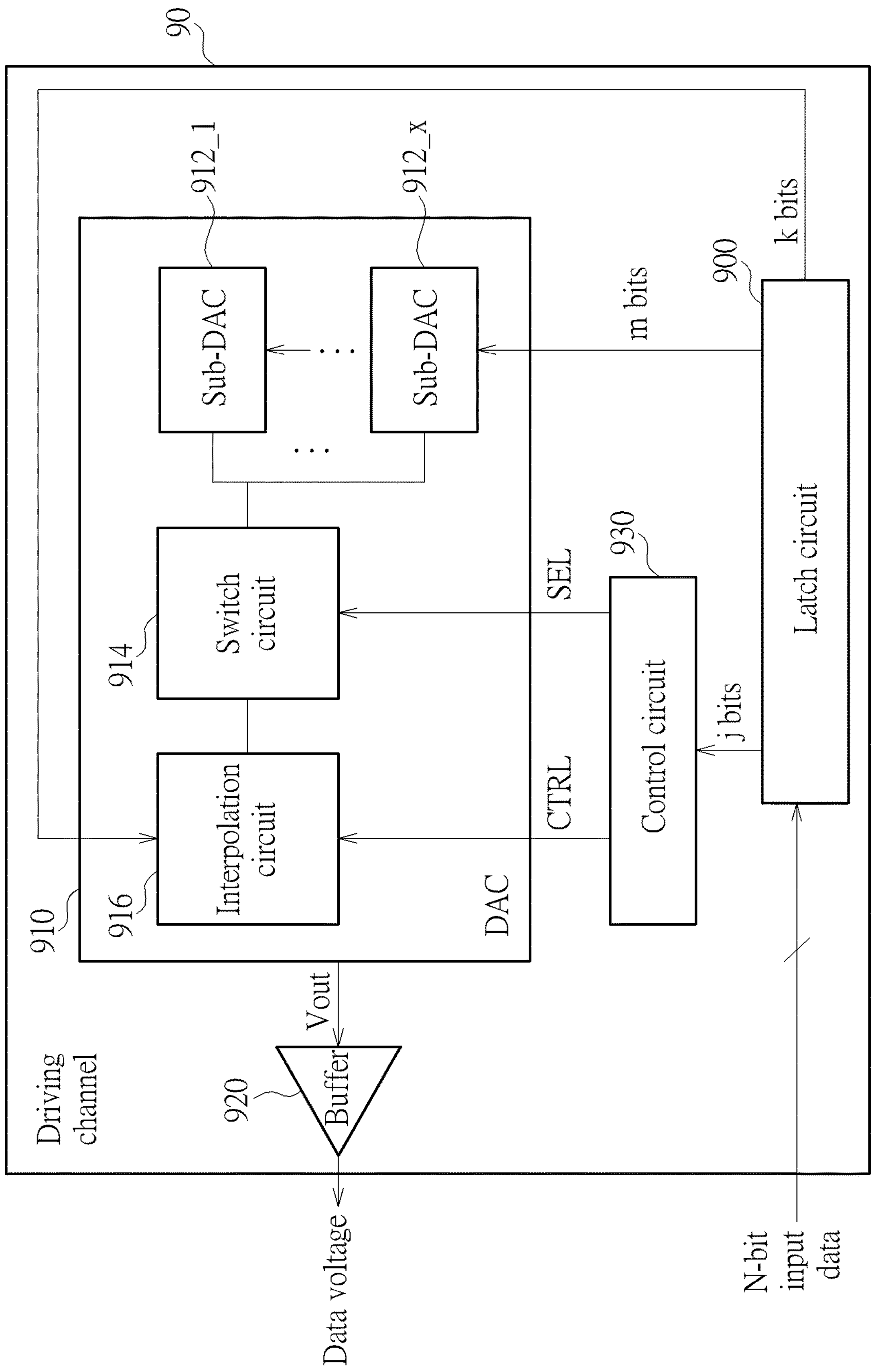
FIG. 9 is a schematic diagram of a driving channel according to an embodiment of the present invention.

FIG. 9 is a schematic diagram of a driving channel 90 according to an embodiment of the present invention. The driving channel 90 may be implemented as any one of the driving channels shown in FIG. 7, for outputting a data voltage to the display panel by receiving an N-bit input data, where N is a positive integer. As shown in FIG. 9, the driving channel 90 includes a latch circuit 900, a DAC 910, an output buffer 920 and a control circuit 930. FIG. 9 illustrates the detailed implementation of the DAC 910, which includes a plurality of sub-DACs 912_1-912_*x*, a switch circuit 914 and an interpolation circuit 916.

The received input data is stored in the latch circuit 900 in an appropriate manner as an N-bit data code. Each sub-DAC 912_1-912_*x* may be an m-bit sub-DAC, for receiving m bits of the N-bit data code from the latch circuit 900 (where m is a positive integer smaller than N), and generating a set of intermediate voltages according to the received m bits of the data code. The switch circuit 914, which is coupled between the sub-DACs 912_1-912_*x* and the interpolation circuit 916, may electrically connect the interpolation circuit 916 with a selected sub-DAC among the sub-DACs 912_1-912_*x* according to at least one select signal SEL, allowing the selected sub-DAC to output a selected set of intermediate voltages to the interpolation circuit 916. The switch circuit 914 is controlled by the control circuit 930, which may receive j bits of the N-bit data code from the latch circuit 900 (where j is a positive integer smaller than N), and output the select signal SEL to the switch circuit 914 accordingly. In this embodiment, the control circuit 930 may also output at least one interpolation control signal CTRL to the interpolation circuit 916 according to the j bits of the data code received from the latch circuit 900. The interpolation circuit 916 may perform interpolation on the selected set of intermediate voltages according to k bits of the N-bit data code (where k is a positive integer smaller than N) and also according to the interpolation control signal CTRL which may provide one or more additional interpolation bits or not. Therefore, the interpolation circuit 916 may generate and output at least one output voltage Vout to the output buffer 920. The output buffer 920 then outputs a data voltage to the display panel according to the output voltage Vout. In an embodiment, the output buffer 920 may be implemented with an operational amplifier (OP).

In this embodiment, the combination of the m bits received by the sub-DACs 912_1-912_*x*, the k bits used for the interpolation circuit 916, and the j bits received by the control circuit 930 is equivalent to the N-bit data code; that is, N=m+k+j. In other words, when the driving channel 90 receives an N-bit data code, the N-bit data code may be divided into m bits provided for the sub-DACs 912_1-912_*x*, k bits provided for the interpolation circuit 916, and j bits provided for the control circuit 930.

Figure 10:
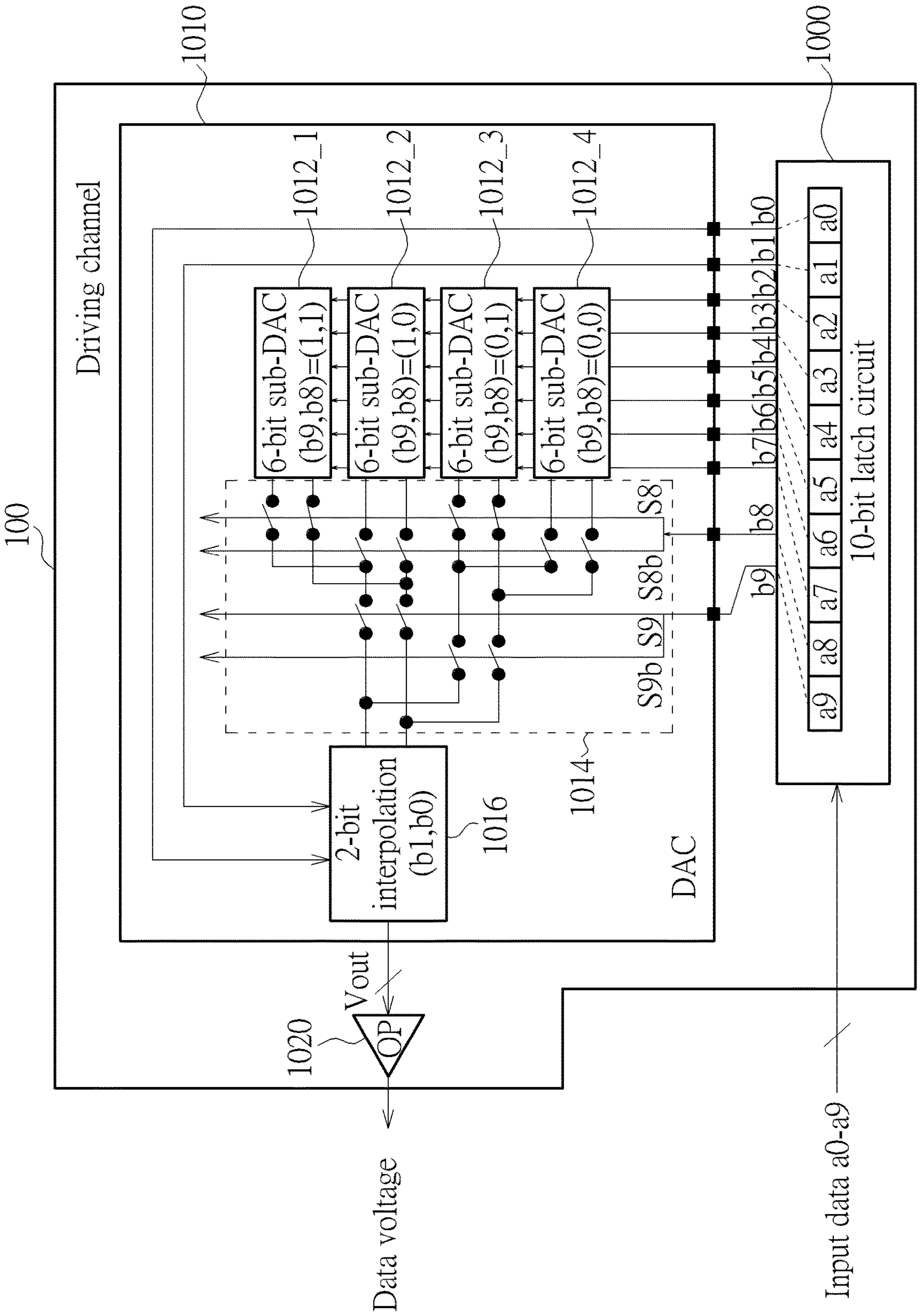
FIG. 10 is a schematic diagram of an exemplary driving channel of a source driver used for a display panel.

FIG. 10 is a schematic diagram of an exemplary driving channel 100 of a source driver used for a display panel, where the driving channel 100 includes a latch circuit 1000, a DAC 1010 and an OP 1020. As shown in FIG. 10, the DAC 1010 includes 4 sub-DACs 1012_1-1012_4, a switch circuit 1014 and an interpolation circuit 1016.

In detail, the driving channel 100 may receive a 10-bit input data a0-a9 and store the input data a0-a9 in the latch circuit 1000 as a 10-bit data code b0-b9. The data code b0-b9 may be used to control the DAC 1010 to output a corresponding output voltage Vout to the OP 1020, allowing the OP 1020 to output the data voltage to the display panel. The input data a0-a9 may be correspondingly written into the bit positions of the latch circuit 1000 to generate the data code b0-b9, respectively, which is used to control the operations of the DAC 1010. In this embodiment, the sub-DACs 1012_1-1012_4 are 6-bit sub-DACs and the interpolation circuit 1016 is a 2-bit interpolation circuit. The switch circuit 1014 includes multiple switches coupled between the sub-DACs 1012_1-1012_4 and the interpolation circuit 1016. The bits b0-b1 are used for controlling the interpolation circuit 1016, the bits b2-b7 are used for controlling the sub-DACs 1012_1-1012_4 to generate the respective set of intermediate voltages, and the bits b8-b9 are used for controlling the switch circuit 1014 to select one of the sub-DACs to output the selected set of intermediate voltages. In this embodiment, the bit b9 is the most significant bit (MSB) and the bit b0 is the least significant bit (LSB), and other bits can be derived accordingly. Therefore, 2 MSBs are used for the switch circuit 1014 to determine the selected sub-DAC, 6 medium bits are used for the sub-DACs 1012_1-1012_4 to generate the respective intermediate voltages, and 2 LSBs are used for the interpolation circuit 1016 to perform voltage interpolation.

Through the control of the bits b8-b9, the switch circuit 1014 may selectively connect one of the 4 sub-DACs 1012_1-1012_4 to the interpolation circuit 1016, allowing the selected sub-DAC to output the selected set of intermediate voltages to the interpolation circuit 1016. In detail, the bit b8 may be used to generate two control signals S8 and S8*b* which are inverse to each other, and the bit b9 may be used to generate two control signals S9 and S9*b* which are inverse to each other. These control signals may be sent to corresponding switches in the switch circuit 1014 to select the output of the sub-DACs 1012_1-1012_4. These 4 sub-DACs 1012_1-1012_4 are configured to generate the respective set of intermediate voltages having different voltage levels, and one set of intermediate voltages are selected under the corresponding bit values, i.e., according to whether the bit values (b9,b8) are (1,1), (1,0), (0,1) or (0,0). Supposing that the output voltage range of the DAC 1010 is 0V to VDDA, the sub-DAC 1012_1 is responsible to output the voltage range of ¾×VDDA to VDDA, the sub-DAC 1012_2 is responsible to output the voltage range of 2/4×VDDA to ¾×VDDA, the sub-DAC 1012_3 is responsible to output the voltage range of ¼×VDDA to 2/4×VDDA, and the sub-DAC 1012_4 is responsible to output the voltage range of 0V to ¼×VDDA. In addition, as shown in FIG. 10, each sub-DAC 1012_1-1012_4 is deployed with 2 output terminals that may be respectively coupled to 2 input terminals of the interpolation circuit 1016 through the control of the switch circuit 1014. Therefore, corresponding to each output data voltage, the selected sub-DAC may output 2 intermediate voltages to the interpolation circuit 1016, and thus the interpolation circuit 1016 is able to generate a finer level of the output voltage Vout through interpolation.

As mentioned above, in the DAC of the driving channel, a control circuit (e.g., the control circuit 930 shown in FIG. 9) may be included and coupled between the latch circuit, the switch circuit and the interpolation circuit, to control the DAC to generate an output voltage which is adapted to the data voltage range of subpixels of different colors, under the same arrangements of gamma voltages generated by a single gamma voltage generation circuit.

Figure 11:
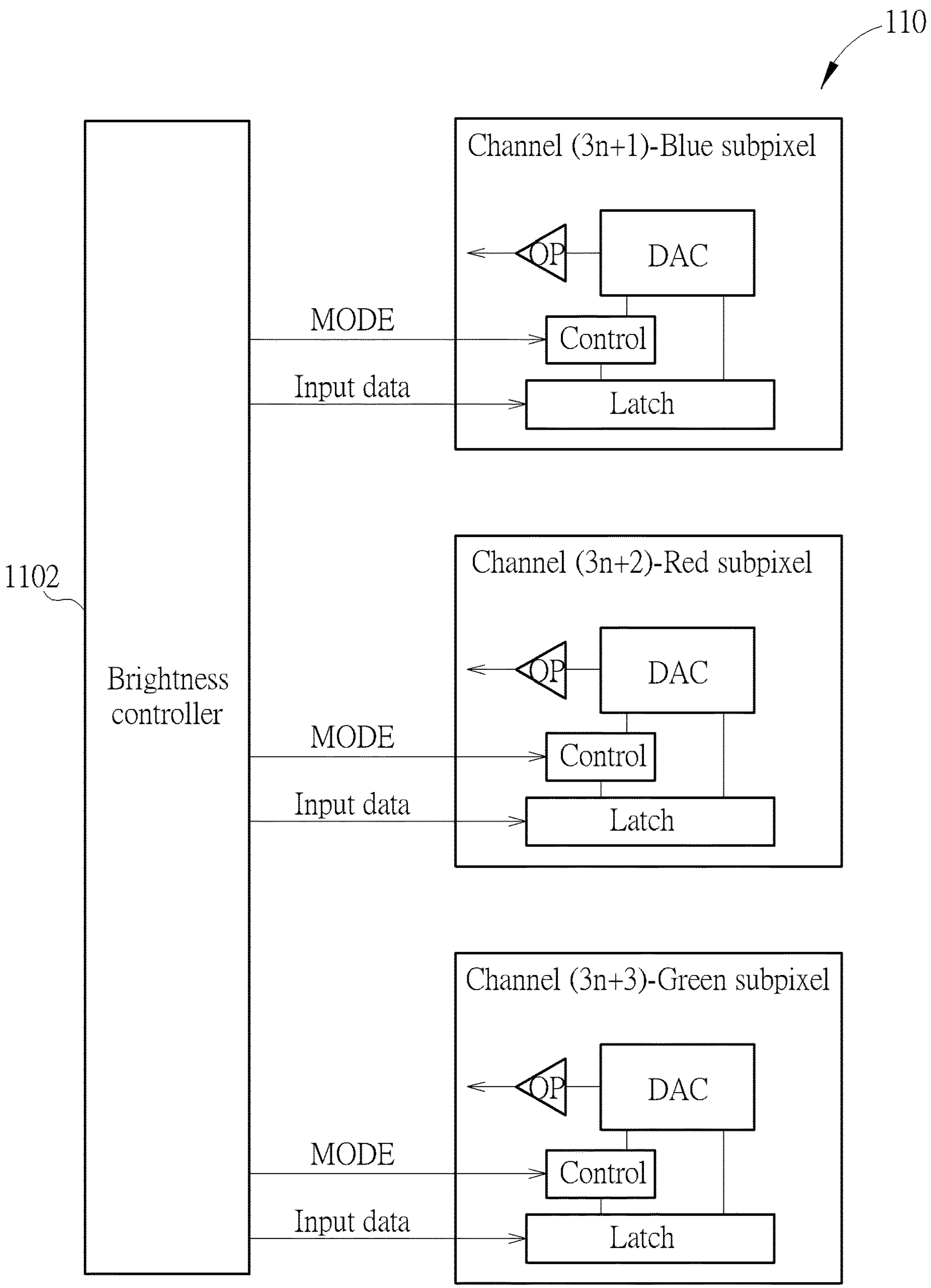
FIG. 11 is a schematic diagram of a source driver according to an embodiment of the present invention.

FIG. 11 is a schematic diagram of a source driver 110 according to an embodiment of the present invention. The source driver 110 includes a brightness controller 1102 and a plurality of driving channels. The brightness controller 1102 is configured to transmit input data to each driving channel. The brightness controller 1102 may be an image processing circuit implemented in a display driver integrated circuit (IC). The image processing circuit may modify the display data based on various image processing operations, in order to improve the visual effect and image quality of the output image. In an embodiment, the brightness controller 1102 and the source driver 110 may be integrated in the display driver IC.

In this embodiment, different driving channels may be configured to output data voltages to subpixels of different colors in the OLED panel, where the (3n+1)th channels are used for blue subpixels, the (3n+2)th channels are used for red subpixels, and the (3n+3)th channels are used for green subpixels, where n may be any positive integer. Each driving channel includes a latch circuit, a DAC, an OP and a control circuit, and the structures and implementations of these modules are similar to those shown in FIG. 9. Based on the applications of different colors, each driving channel may operate in different modes. In addition to transmitting the input data to the latch circuit in the driving channel, the brightness controller 1102 may further output a mode control signal MODE to the control circuit, to control the operation mode of the driving channel. The value of the mode control signal MODE may correspond to the color of subpixels driven by the driving channel. Based on the mode control signal MODE, the control circuit may control the interpolation circuit to determine whether to provide additional interpolation bit(s). In several embodiments, the input data may be reordered before being written into the latch circuit, to be adapted to the bit values for the sub-DACs and the bit values for interpolation in different operation modes.

In an embodiment, based on the mode control signal MODE, the control circuit may control the configuration of the select signal (s) in the DAC of the (3n+1)th channel to be different from the configuration of the select signal(s) in the DAC of the (3n+2)th channel and also different from the configuration of the select signal(s) in the DAC of the (3n+3)th channel. Correspondingly, the configuration of the interpolation control signal(s) output by the control circuit to the interpolation circuit may also be different in the DAC of the (3n+1)th channel, the (3n+2)th channel and the (3n+3)th channel.

Figure 12:
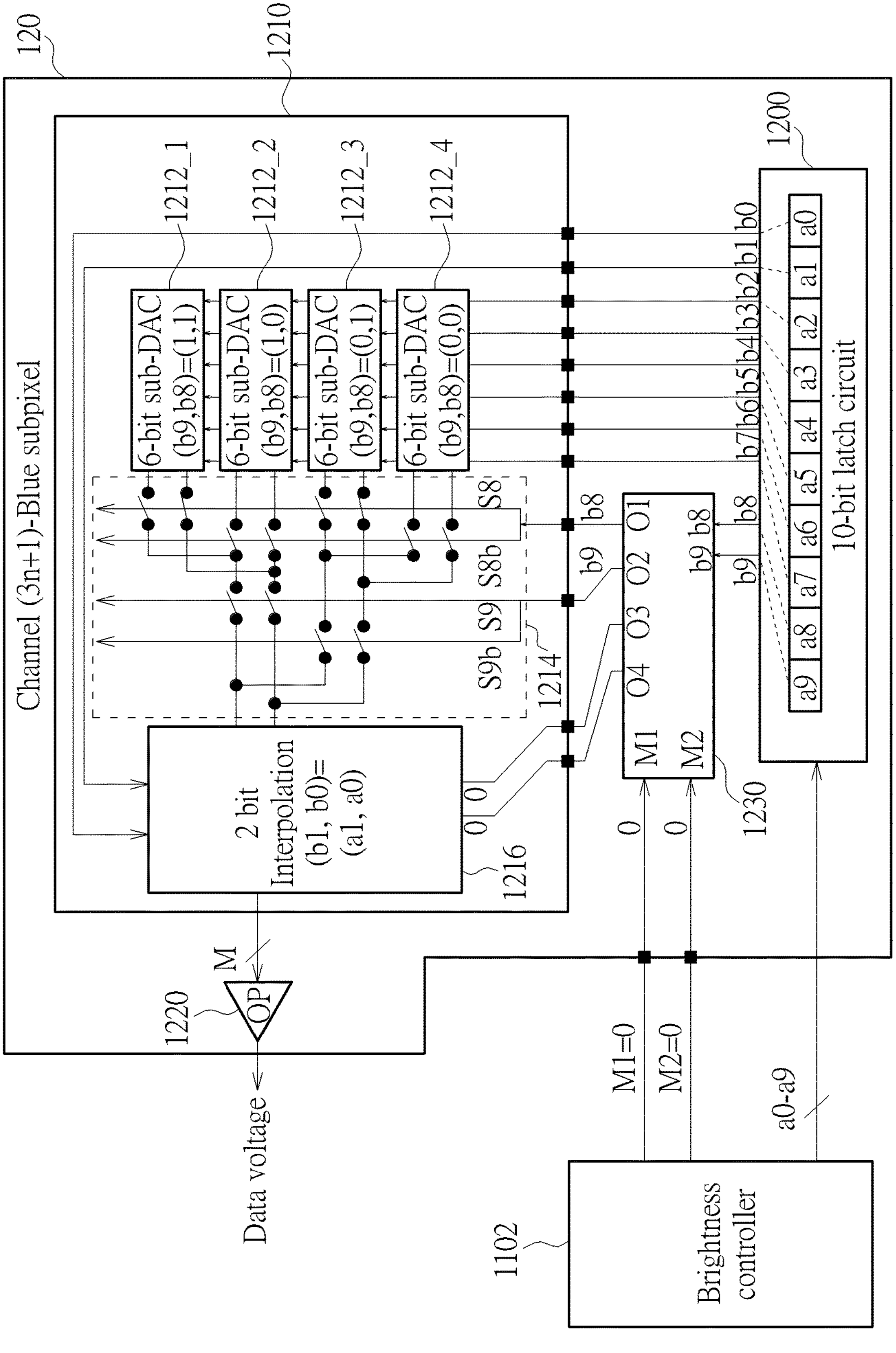
FIG. 12 illustrates the operations of a driving channel for blue subpixels.

FIG. 12 illustrates the operations of a driving channel 120 for blue subpixels, which may be the (3n+1)th channel shown in FIG. 11 and receive control of the brightness controller 1102. This driving channel 120 is configured to output a data voltage according to input data a0-a9 to be displayed by a blue subpixel, and includes a latch circuit 1200, a DAC 1210, an OP 1220 and a control circuit 1230. Similarly, the DAC 1210 is composed of 4 sub-DACs 1212_1-1212_4, a switch circuit 1214 and an interpolation circuit 1216.

Since the data voltages for blue OLEDs correspond to the full-range voltage that can be output by a driving channel, the setting of the driving channel 120 is similar to the setting of the driving channel 100 shown in FIG. 10. In short, the input data a0-a9 may be correspondingly written into the latch circuit 1200 without being reordered, to be the data code b0-b9. Among the data code b0-b9, the bits b0-b1 are used for controlling the interpolation circuit 1216, the bits b2-b7 are used for controlling each sub-DAC 1212_1-1212_4, and the bits b8-b9 are output to the control circuit 1230.

More specifically, in addition to receiving the bits b8-b9, the control circuit 1230 further receives the mode control signal from the brightness controller 1102. In this embodiment, the mode control signal has two signal bits M1 and M2. In addition, the control circuit 1230 has 4 output terminals O1-O4, where the output terminals O1 and O2 are used for outputting two select signals to the switch circuit 1214, to control the switches to select a specific sub-DAC to output the intermediate voltages, and the output terminals O3 and O4 are used for outputting two interpolation control signals to the interpolation circuit 1216, to control the interpolation circuit 1216 to perform additional 1-bit or 2-bit interpolation or not. According to the mode control signals M1 and M2, the control circuit 1230 may determine the signal values output through the output terminals O1-O4, for controlling the operations of the switch circuit 1214 and the interpolation circuit 1216.

In addition, the interpolation circuit 1216 at most has 4-bit interpolation function, wherein the control of 2 bits is from the bits b0 and b1 of the latch circuit 1200, and the control of the other 2 bits is from the output terminals O3 and O4 of the control circuit 1230.

Therefore, when the driving channel 120 needs to output a data voltage to the blue subpixel, the brightness controller 1102 may output the mode control signals M1=0 and M2=0 to the control circuit 1230 in the driving channel 120; simultaneously, the brightness controller 1102 writes the input data a0-a9 into the positions of bits b0-b9 of the latch circuit 1200 sequentially without reordering. According to the mode control signals M1=0 and M2=0, the control circuit 1230 may send the values of bits b8-b9 to the output terminals O1 and O2, respectively. The bits b8-b9 are the 2 MSBs of the data code, which are utilized as the select signals to be output by the control circuit 1230 to the switch circuit 1214. The 2 values of bits b8-b9 are further used to generate the control signals S8, S8*b*, S9 and S9*b* to control the switch circuit 1214 to select one of the sub-DACs 1212_1-1212_4 to be coupled to the interpolation circuit 1216 and output the intermediate voltages to the interpolation circuit 1216.

The control circuit 1230 also outputs the interpolation control signals which equal 0 through the output terminals O3 and O4, to disable the additional 2-bit interpolation function of the interpolation circuit 1216.

As a result, since the driving channel 120 needs to output the full-range data voltage for blue OLEDs, the bits b8-b9 may be used to select one of the 4 sub-DACs 1212_1-1212_4 to output the intermediate voltages; that is, all the sub-DACs 1212_1-1212_4 are taken as candidates to determine the selected intermediate voltages by the switch circuit 1214, thereby realizing the full-range data voltage. Meanwhile, the interpolation circuit 1216 performs 2-bit interpolation by receiving the control of bits b0-b1, so as to realize the overall 10-bit DAC function.

Figure 13:
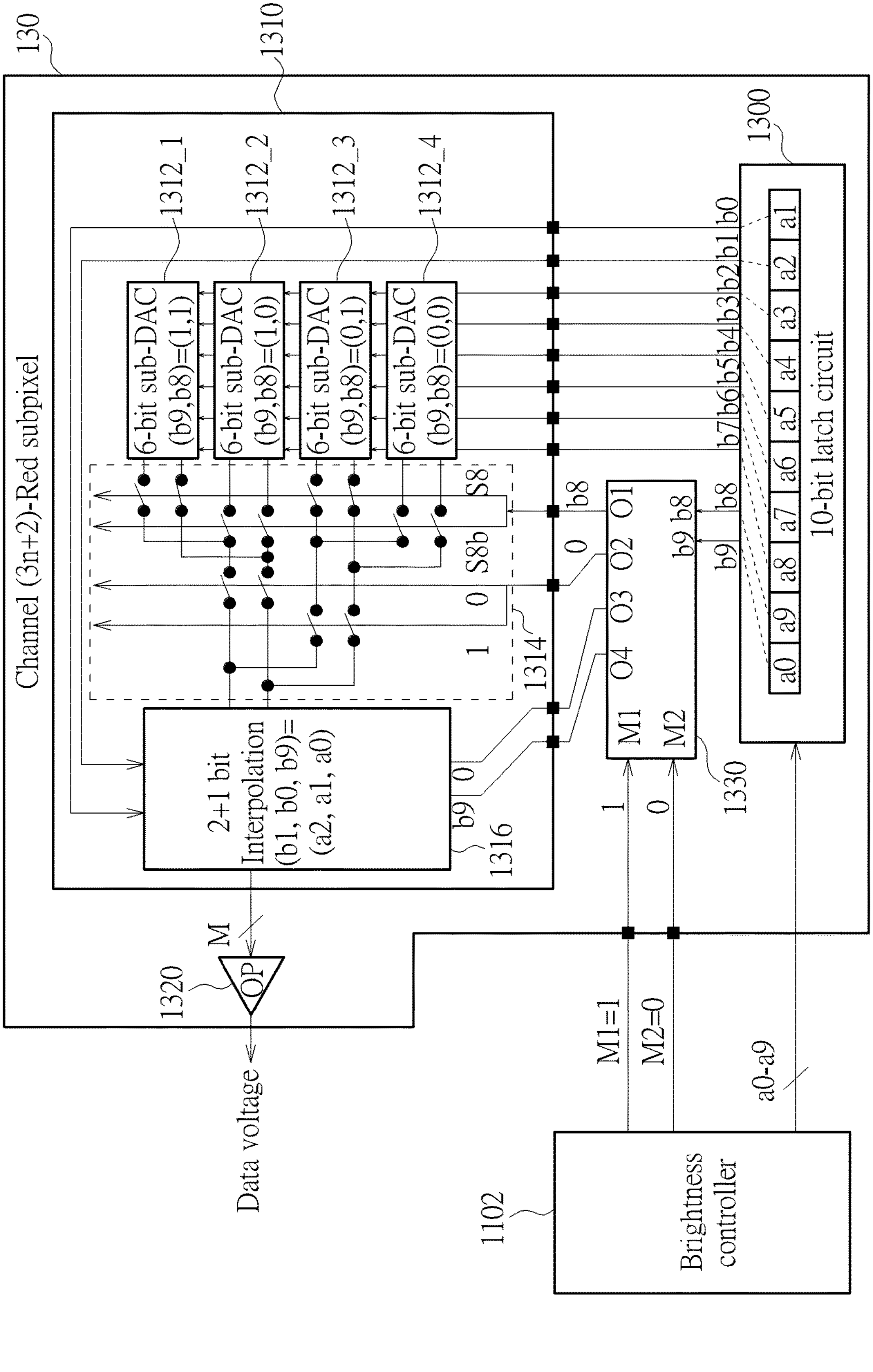
FIG. 13 illustrates the operations of a driving channel for red subpixels.
Figure 14:
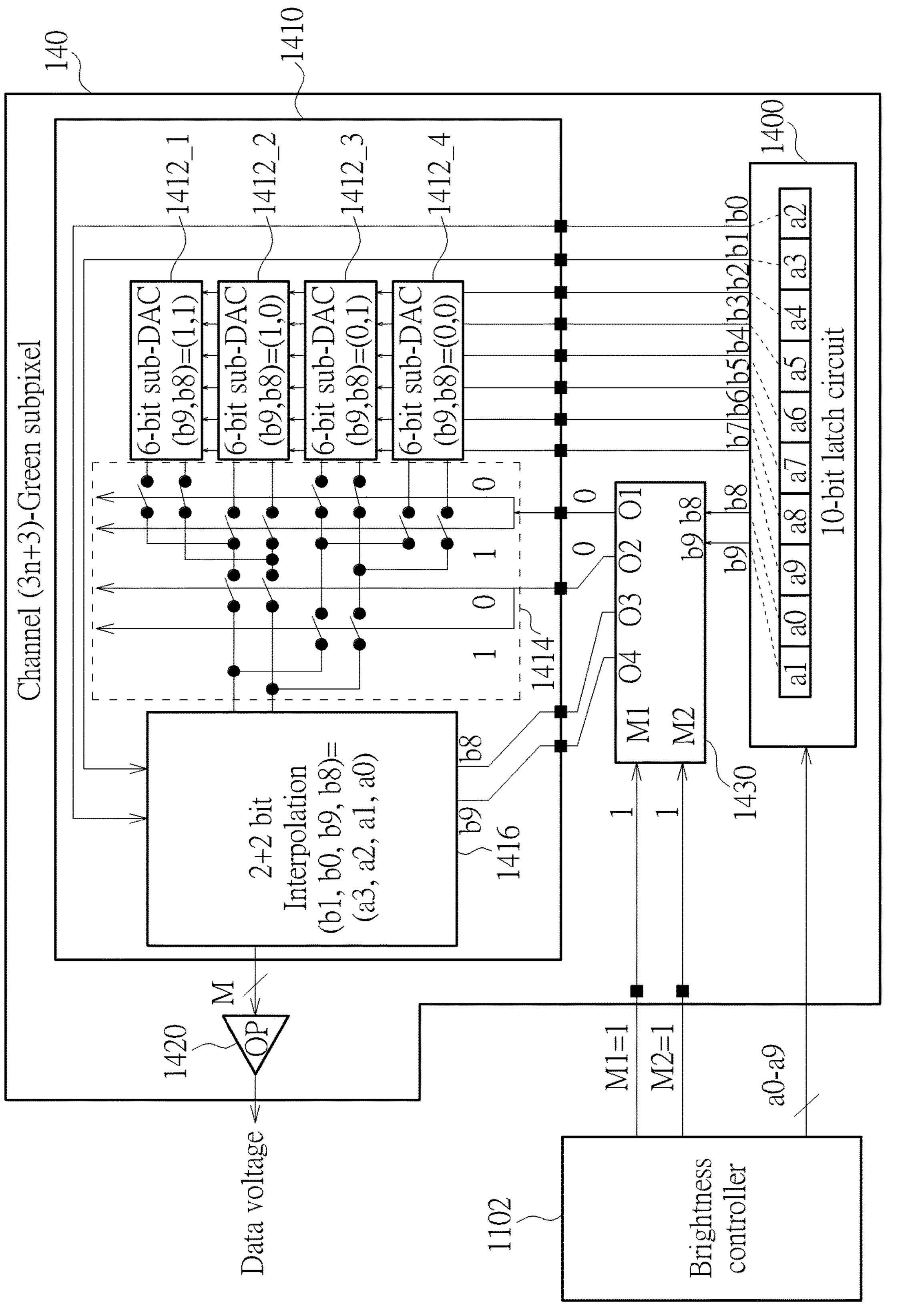
FIG. 14 illustrates the operations of a driving channel for green subpixels.

FIGS. 13 and 14 are based on the display panel shown in FIGS. 2 and 3 as an example, where the transistors for driving the OLEDs in the subpixels are NMOS transistors; hence, when the subpixel receives a higher data voltage, the generated brightness will be larger.

FIG. 13 illustrates the operations of a driving channel 130 for red subpixels, which may be the (3N+2)th channel shown in FIG. 11 and receive control of the brightness controller 1102. The driving channel 130 is configured to output a data voltage according to input data a0-a9 to be displayed by a red subpixel, and includes a latch circuit 1300, a DAC 1310, an OP 1320 and a control circuit 1330. Similarly, the DAC 1310 is composed of 4 sub-DACs 1312_1-1312_4, a switch circuit 1314 and an interpolation circuit 1316.

When the driving channel 130 needs to output the data voltage to the red subpixel, the brightness controller 1102 may output the mode control signals M1=1 and M2=0 to the control circuit 1330 in the driving channel 130. In addition, the input data a0-a9 to be sent to the driving channel 130 are reordered by performing circular shift of one bit position to the LSB direction, and then transmitted to the latch circuit 1300 by the brightness controller 1102; hence, the input data a0-a9 written into the bits b0-b9 may be shifted by 1 position. After the circular shift, the input data sequentially written into the positions of the bits b0-b9 are a1-a9 and a0 (placed in the MSB position).

According to the mode control signals M1=1 and M2=0, the control circuit 1330 may send the bit b8 (which is the value a9 of the input data after circular shift) as a select signal to the switch circuit 1314 through the output terminal O1, and output the constant value 0 as another select signal to the switch circuit 1314 through the output terminal O2. In such a situation, the switches which are originally controlled by the bit b9 in FIG. 12 receive the signal value 0 instead, so that the 2 upper sub-DACs 1312_1 and 1312_2 will not be selected, and only the 2 lower sub-DACs 1312_3 and 1312_4 are used to output the intermediate voltages. In addition, the control circuit 1330 outputs the signal 0 through the output terminal O3, and the bit b9 (which is the value a0 of the input data after circular shift) is output to the interpolation circuit 1316 through the output terminal O4.

As a result, with the circular shift of 1 bit position of the input data a0-a9, since the driving channel 130 is configured to output the data voltage for the red OLED (which approximately equals one half of the full-range data voltage for the blue OLED), the bit b8 (i.e., the value a9 of the data code) may be used to select one of the 2 lower sub-DACs 1312_4 and 1312_3 (which are responsible to output the voltage range of 0V to ¼×VDDA and output the voltage range of ¼×VDDA to 2/4×VDDA) to output the intermediate voltages; that is, only 2 of the 4 sub-DACs are taken as candidates to determine the selected intermediate voltages by the switch circuit 1314 to realize the one-half data voltage range. Meanwhile, in addition to receiving the control of bits b0-b1 (i.e., the values a1-a2 of the data code) as 2 interpolation bits, the interpolation circuit 1316 further receives the control of bit b9 (i.e., the value a0 of the data code stored in the bit position b9) as 1 additional interpolation bit, so as to realize totally 3-bit interpolation in the interpolation circuit 1316.

In other words, one bit of the latch circuit originally used for selecting the sub-DAC in the driving channel 120 for blue OLEDs is instead used for controlling the interpolation circuit to increase 1 interpolation bit in the driving channel 130 for red OLEDs, where the received input data are reordered by performing circular shift of one bit position to the LSB direction, i.e., to the right, before being written into the latch circuit, so that the driving channel 130 may still output voltages complying with the data voltage range of the red OLED under the control of equivalently 10-bit data.

FIG. 14 illustrates the operations of a driving channel 140 for green subpixels, which may be the $(3N+3)^{th}$ channel shown in FIG. 11 and receive control of the brightness controller 1102. The driving channel 140 is configured to output a data voltage according to input data a0-a9 to be displayed by a green subpixel, and includes a latch circuit 1400, a DAC 1410, an OP 1420 and a control circuit 1430. Similarly, the DAC 1410 is composed of 4 sub-DACs 1412_1-1412_4, a switch circuit 1414 and an interpolation circuit 1416.

When the driving channel 140 needs to output the data voltage to the green subpixel, the brightness controller 1102 may output the mode control signals M1=1 and M2=1 to the control circuit 1430 in the driving channel 140. In addition, the input data a0-a9 to be sent to the driving channel 140 are reordered by performing circular shift of two bit positions to the LSB direction, and then transmitted to the latch circuit 1400 by the brightness controller 1102; hence, the input data a0-a9 written into the bits b0-b9 may be shifted by 2 positions. After the circular shift, the input data sequentially written into the positions of the bits b0-b9 are a2-a9 and a0-a1 (placed in the two MSB positions).

According to the mode control signals M1=1 and M2=1, the control circuit 1430 may output the constant value 0 to the switch circuit 1414 through the output terminals O1 and O2, and output the bits b8 and b9 (which are the values a0 and a1 of the input data after circular shift) to the interpolation circuit 1416 through the output terminals O3 and O4, respectively. In such a situation, the two select signals received by the switch circuit 1414 are both the constant value 0, so that the 3 upper sub-DACs 1412_1-1412_3 will not be selected, and only the bottommost sub-DAC 1412_4 is used to output the intermediate voltages.

As a result, with the circular shift of 2 bit positions of the input data a0-a9, since the driving channel 140 is configured to output the data voltage for the green OLED (which approximately equals one quarter of the full-range data voltage for the blue OLED), the sub-DAC 1412_4 (which is responsible to output the voltage range of 0V to ¼×VDDA) forcibly outputs the intermediate voltages; that is, only 1 of the 4 sub-DACs is utilized to output the selected intermediate voltages to realize the one-quarter data voltage range. Meanwhile, in addition to receiving the control of bits b0-b1 (i.e., the values a2-a3 of the data code) as 2 interpolation bits, the interpolation circuit 1416 further receives the control of bits b8-b9 (i.e., the 2 values a0-a1 of the data code stored in the bit positions b8-b9) as 2 additional interpolation bits, so as to realize totally 4-bit interpolation in the interpolation circuit 1416.

In other words, two bits of the latch circuit originally used for selecting the sub-DAC in the driving channel 120 for blue OLEDs are instead used for controlling the interpolation circuit to increase 2 interpolation bits in the driving channel 140 for green OLEDs, where the received input data are reordered by performing circular shift of two bit positions to the LSB direction, i.e., to the right, before being written into the latch circuit, so that the driving channel 140 may still output voltages complying with the data voltage range of the green OLED under the control of equivalently 10-bit data.

Note that the above embodiment takes the display panel shown in FIG. 2 as an example, where the transistors for driving the OLEDs in the subpixels are NMOS transistors; hence, when the subpixel receives a higher data voltage, the generated brightness will be larger. In another embodiment, if the transistors for driving the OLEDs in the subpixels are PMOS transistors (such as the LIPS panel shown in FIG. 4), when the subpixel receives a lower data voltage, the generated brightness will be larger. At this moment, due to the smaller data voltage range of the red or green OLEDs, the topmost sub-DAC(s) having higher voltage level is/are selected to output instead. More specifically, as for the driving channel 130 used for the red OLED, one of the 2 upper sub-DACs 1312_1 and 1312_2 responsible to output the voltage range of ¾×VDDA to VDDA and output the voltage range of 2/4×VDDA to ¾×VDDA is selected to output the intermediate voltages to the interpolation circuit 1316; as for the driving channel 140 used for the green OLED, the topmost sub-DAC 1412_1 responsible to output the voltage range of ¾×VDDA to VDDA is applied to output the intermediate voltages to the interpolation circuit 1416.

Therefore, based on different values of the mode control signals M1 and M2, the control circuit may selectively send the values of bits b8-b9 to the switch circuit or the interpolation circuit. This operation is performed with the circular shift of input data written into the latch circuit to realize the output of different data voltage ranges, to be applied to the OLED display where light emission is performed by using OLEDs in different colors. The control circuit may receive the mode control signals M1 and M2 and the data values of bits b8-b9, and correspondingly output signals through the output terminals O1-O4. The detailed operations are shown in Table 1.

TABLE 1

| M2 | M1 | O4 | O3 | O2 | O1 |
|---|---|---|---|---|---|
| 0 | 0 | 0 | 0 | b9 | b8 |
| 0 | 1 | b9 | 0 | 0 | b8 |
| 1 | 0 | X | X | X | X |
| 1 | 1 | b9 | b8 | 0 | 0 |

According to Table 1, the 2-bit mode control signals M1 and M2 may be used to realize the modes and settings corresponding to three different colors as shown in FIGS. 12-14. In addition, the combination of signal values M2=1 and M1=0 may generate any output value (i.e., don't care) without influencing the operations of the present embodiment. Alternatively, another application is incorporated to realize the fourth mode (e.g., the output data voltage for the $4^{th}$ color), which is not limited herein.

The implementations of FIGS. 12-14 may be realized in the source driver 70 shown in FIG. 7, where only one gamma voltage generation circuit 702 may be coupled to the DACs in different driving channels for different colors, to make the implementation of single gamma voltage generation circuit feasible to an OLED panel. In this embodiment, each driving channel may include the same circuit structure, to output different data voltage ranges to subpixels of different colors based on different mode control signals M1 and M2 and corresponding data reordering schemes. The output buffer BUF shown in FIG. 7 may be the OP 1220, 1320 or 1420 as shown in FIGS. 12-14. The interpolation circuit in each driving channel may be integrated in the DAC as shown in FIGS. 12-14, or may be coupled to the output of the DAC as shown in FIG. 7.

In an embodiment, the DACs in different driving channels for different colors may receive different ranges and different numbers of gamma voltages. For example, as for a driving channel for driving blue OLEDs, the received gamma voltages may be in a maximum range and/or have a maximum number, to be adapted to the largest data voltage range of the blue OLEDs. As for a driving channel for driving red OLEDs, the received gamma voltages may be in a medium range and/or have a medium number, to be adapted to the medium data voltage range of the red OLEDs. As for a driving channel for driving green OLEDs, the received gamma voltages may be in a minimum range and/or have a minimum number, to be adapted to the smallest data voltage range of the green OLEDs.

Figure 15:
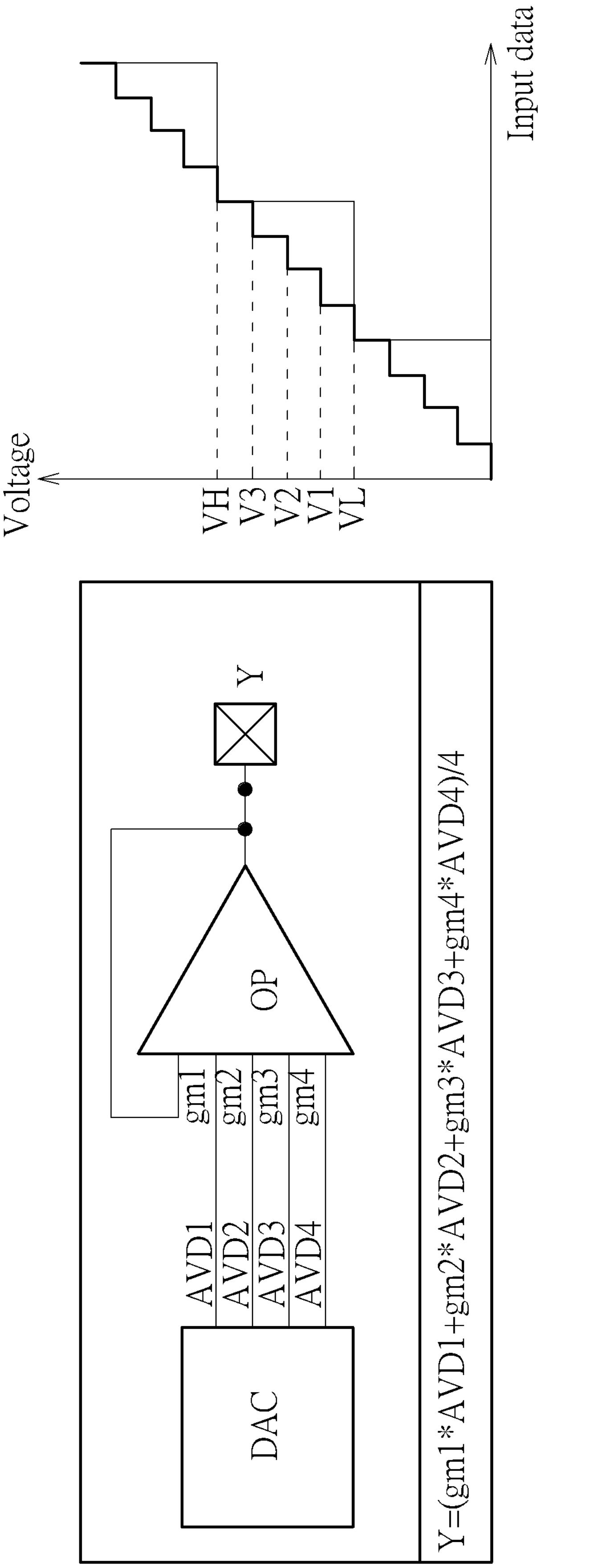
FIG. 15 is a schematic diagram of an exemplary implementation of the interpolation circuit according to an embodiment of the present invention.

FIG. 15 is a schematic diagram of an exemplary implementation of the interpolation circuit according to an embodiment of the present invention, where the interpolation circuit may be any of the interpolation circuit 1216, 1316 or 1416 shown in FIGS. 12-14. In this embodiment, the interpolation circuit may be integrated in the OP, where the combination of different transconductances (gm) in the OP is applied to interpolate finer output voltage variations. FIG. 15 takes the 2-bit interpolation as an example, which allows the adjacent voltage difference output by the OP to equal ¼ of the adjacent voltage difference output by the DAC. In detail, the OP may be designed to have 4 input terminals, which correspond to 4 gm values (gm1-gm4) and receive voltages AVD1-AVD4 from the DAC, respectively. In order to make the OP accurately generate the interpolated voltage, gm1-gm4 may be designed to have the same value (i.e., gm1=gm2=gm3=gm4), and the output voltage Y of the OP may be calculated based on the voltages AVD1-AVD4 received from the DAC, as shown in FIG. 15.

Please refer to FIG. 15 along with FIGS. 12-14. According to the structure of the driving channel, the interpolation circuit may receive 2 adjacent voltages VL and VH from a sub-DAC based on selection of the switch circuit, to generate and output interpolated voltages V1-V3 between VL and VH, where each of the voltages AVD1-AVD4 may be one of the voltages VL and VH. The interpolation circuit also receives the bit values from the latch circuit and/or the control circuit, to set each of the voltages AVD1-AVD4 to equal VL or VH. In detail, as for the DAC shown in FIGS. 12-14, it may be set that M=4, which means that the OP receives the voltages AVD1-AVD4 through 4 input terminals, respectively. As a result, the OP may generate the interpolated voltages V1-V3 according to the values of the voltages AVD1-AVD4. For example, if the voltage V1 (which equals (VL×3+VH)/4) needs to be generated, it may be set that AVD1-AVD3 equal VL and AVD4 equals VH; if the voltage V2 (which equals (VL×2+VH×2)/4) needs to be generated, it may be set that AVD1 and AVD2 equal VL and AVD3 and AVD4 equal VH; if the voltage V3 (which equals (VL+VH×3)/4) needs to be generated, it may be set that AVD1 equals VL and AVD2-AVD4 equal VH. As a result, through the design and switching of the OP's input terminals, each of the interpolated voltages V1-V3 between the voltages VL and VH may be realized.

By the same method, the OP may be designed to include 8 input terminals to realize 3-bit interpolation, or include 16 input terminals to realize 4-bit interpolation. In the embodiment shown in FIGS. 12-14, the OP may be designed to have 16 input terminals (i.e., M=16). The interpolation circuit may determine to use 4, 8 or 16 of the input terminals based on the mode setting and the signals provided from the control circuit (through the output terminals O3 and O4), so as to realize the 2-bit, 3-bit or 4-bit interpolation in each driving channel based on the subpixel of which color is to be driven by the driving channel.

It should be noted that the structure of FIG. 15 is merely one of various implementations of the interpolation circuit of the present invention. Those skilled in the art should understand that the voltage interpolation may be realized by various methods, such as the current mode, voltage mode, or current/voltage hybrid mode. As long as a medium voltage having a specific level between two input voltages can be generated, the method may be applicable to the interpolation circuit of the present invention. For example, in another embodiment, the gain of the OP may be modified by adjusting the tail current of the input terminals of the OP, in order to control the magnitude of the output voltage of the OP and achieve the purpose of interpolation. Alternatively, in another embodiment, the input signals of the OP may be designed to be multiplied by different gm values as weightings, so as to generate a target output voltage value.

Please note that the present invention aims at providing a novel structure of the DAC in each driving channel of a source driver. Those skilled in the art may make modifications and alterations accordingly. For example, the embodiments of the present invention are applicable to any type of self-luminous display panel such as an OLED panel, LED panel, mini-LED panel, micro-LED panel, and micro-OLED panel, but not limited thereto. The LEDs/OLEDs in different colors have different luminous efficiencies and thus are requested to be provided with different data voltage ranges under the same grayscale values, and the DAC structure provided in the present invention may be applied to supply the data voltages to these LEDs/OLEDs.

In addition, the implementation of the mode control signal (s) provided in this disclosure is merely an example. For example, in another embodiment, if there are more modes that the DACs need to be operated, a mode control signal having more bits may be necessary. This implementation is applicable to a panel having OLEDs in more different colors. Also, the combination of bit values of the mode control signal corresponding to different driving channels is not limited to that shown in Table 1.

Further, the number of data bits and their allocations to the sub-DACs, the switch circuit and the interpolation circuit are merely an example in the embodiments shown in FIGS. 12-14. As mentioned above, the sub-DACs may be an m-bit sub-DAC for receiving m bits of the N-bit data code, the control circuit may receive j bits of the N-bit data code, and the interpolation circuit may perform interpolation by receiving k bits of the N-bit data code from the latch circuit. The values of m, j and k may be set in any appropriate manner, to provide different data voltage ranges for the OLED subpixels of different colors while making the overall resolution for generating the gamma curves consistent. Among the j bits received by the control circuit, there may be j1 bit(s) used for controlling the switch circuit and j2 bit (s) used for providing additional interpolation bit (s) for the interpolation circuit, where each of j1 and j2 may be an integer from 0 to j, and j1+j2=j. In order to realize different data voltage ranges, the number j1 used for the switch circuit in a first DAC in a first driving channel for driving a first-color subpixel may be different from the number j1 used for the switch circuit in a second DAC in a second driving channel for driving a second-color subpixel, and thus different numbers of sub-DACs are taken as candidates for the switch circuit between the first DAC and the second DAC.

Correspondingly, the interpolation circuit of the first DAC and the interpolation circuit of the second DAC may be controlled by different numbers of j2 bit(s), and thereby perform interpolation according to different numbers of interpolation bits. The number of interpolation bits of each interpolation circuit is the summation of the k bits received from the latch circuit and the j2 bit(s) received from the control circuit.

To sum up, the present invention provides the structure of a DAC and a source driver for a display panel, to perform display control for an OLED panel. Since the OLEDs in different colors in the OLED panel have different conversion characteristics, the DAC of the present invention may output the data voltage ranges corresponding to different colors by using the same gamma voltage generation circuit with identical bit resolution under different modes, to be adapted to the luminous efficiency of the OLEDs in different colors.

In an embodiment, in the driving channel corresponding to a blue OLED, 8-bit DAC control along with a 2-bit interpolation circuit may be used to generate the data voltage output with 10-bit resolution. In the driving channel corresponding to a red OLED, 7-bit DAC control along with a 3-bit interpolation circuit may be used to generate the data voltage output with 10-bit resolution. In the driving channel corresponding to a green OLED, 6-bit DAC control along with a 4-bit interpolation circuit may be used to generate the data voltage output with 10-bit resolution. As for the driving channel of the red or green OLED with a smaller data voltage range, some bit(s) originally used for controlling larger (or smaller) output voltages is/are not used; hence, the bit reordering scheme of the data code may be applied to let the MSB(s) to be used to control fewer numbers of sub-DAC(s) with smaller (or larger) output voltages, to comply with the data voltage range of the red or green OLED, while several LSB(s) are output to the interpolation circuit instead, to increase the interpolation bit count. As a result, even in a smaller data voltage range of the red or green OLED, additional interpolation may still be applied to restore the resolution, to generate a more suitable characteristic curve of input grayscales versus output voltages.

In an embodiment, a brightness controller may be used to control each driving channel of the source driver, where the driving channels for driving the blue OLED, red OLED and green OLED may have the same structure, but configured with different mode settings to output different data voltage ranges. The driving channel may include a control circuit for receiving the mode control signal (s) from the brightness controller, to realize the application of different data voltage ranges by applying appropriate signal switching between the sub-DACs and interpolation circuit along with input data reordering. As a result, a single gamma voltage generation circuit may be used for driving the OLED panel with satisfactory gamma voltage arrangements for each color.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A source driver, comprising a first digital-to-analog converter (DAC) and a second DAC, the first DAC being in a first driving channel for driving a first-color subpixel and the second DAC being in a second driving channel for driving a second-color subpixel, each of the first DAC and the second DAC being configured to output at least one output voltage according to an N-bit data code, and each of the first DAC and the second DAC comprising: a plurality of sub-DACs, wherein each of the sub-DACs is configured to receive m bits of the N-bit data code and generate a set of intermediate voltages according to the m bits of the N-bit data code; an interpolation circuit, configured to perform an interpolation on a selected set of intermediate voltages according to k bits of the N-bit data code and at least one interpolation control signal, to generate the at least one output voltage; and a switch circuit, coupled to the plurality of sub-DACs and the interpolation circuit, and configured to, according to a first select signal and a second select signal, electrically connect the interpolation circuit and a selected sub-DAC among the plurality of sub-DACs which outputs the selected set of intermediate voltages, wherein the interpolation circuit of the first DAC and the interpolation circuit of the second DAC respectively perform the interpolation on the respective selected set of intermediate voltages according to different numbers of interpolation bits, wherein the at least one output voltage is output to an output buffer, which is configured to output a data voltage according to the at least one output voltage.

2. The source driver of claim 1, wherein each of the first DAC and the second DAC is configured to be coupled to: a latch circuit, for storing the N-bit data code; and a control circuit, coupled to the latch circuit, the switch circuit and the interpolation circuit, and configured to receive most significant j bits of the N-bit data code stored Page 29 of 34 in the latch circuit, output the at least one interpolation control signal to the interpolation circuit, and output the first select signal and the second select signal to the switch circuit.

3. The source driver of claim 2, wherein a combination of the m bits received by the plurality of sub-DACs, the k bits used for the interpolation circuit, and the j bits received by the control circuit is equivalent to the N-bit data code.

4. The source driver of claim 2, wherein the N-bit data code stored in the latch circuit comprises input data transmitted from a brightness controller, and wherein the input data are not reordered by the brightness controller before being transmitted to the latch circuit when the input data are to be displayed by the first-color subpixel, and the input data are reordered by the brightness controller before being transmitted to the latch circuit when the input data are to be displayed by the second-color subpixel.

5. The source driver of claim 4, wherein the input data are reordered by performing circular shift of one or more bit positions to the least significant bit direction by the brightness controller before the input data are transmitted to the latch circuit, when the input data are to be displayed by the second-color subpixel.

6. The source driver of claim 4, wherein the input data are not reordered by the brightness controller before being transmitted to the latch circuit when the input data are to be displayed by the first-color subpixel and the first-color subpixel is a blue subpixel.

7. The source driver of claim 4, wherein the input data are reordered by performing circular shift of one bit position to the least significant bit direction by the brightness controller before the input data are transmitted to the latch circuit, when the input data are to be displayed by the second-color subpixel and the second-color subpixel is a red subpixel.

8. The source driver of claim 4, wherein the input data are reordered by performing circular shift of two bit positions to the least significant bit direction by the brightness controller before the input data are transmitted to the latch circuit, when the input data are to be displayed by the second-color subpixel and the second-color subpixel is a green subpixel.

9. The source driver of claim 2, wherein the most significant two bits of the N-bit data code stored in the latch circuit are utilized as the first select signal and the second select signal in the first DAC, and the first-color subpixel is a blue subpixel.

10. The source driver of claim 2, wherein at least one of the most significant two bits of the N-bit data code stored in the latch circuit is utilized as the first select signal and the second select signal is a constant value in the second DAC, and the second-color subpixel is a red subpixel.

11. The source driver of claim 2, wherein the first select signal and the second select signal are constant values in the second DAC, and the second-color subpixel is a green subpixel.

12. The source driver of claim 2, wherein at least one of the most significant two bits of the N-bit data code stored in the latch circuit is utilized as the at least one interpolation control signal in the second DAC and the second-color subpixel is a red subpixel or a green subpixel, to add an additional bit for the interpolation.

13. The source driver of claim 1, wherein a configuration of the first select signal and the second select signal in the first DAC is different from a configuration of the first select signal and the second select signal in the second DAC.

14. The source driver of claim 1, wherein a first set of intermediate voltages generated by a first sub-DAC among the plurality of sub-DACs and a second set of intermediate voltages generated by a second sub-DAC among the plurality of sub-DACs have different voltage levels.

15. The source driver of claim 1, wherein the first DAC is configured to output a first voltage range by taking all of the plurality of sub-DACs as candidates to determine the selected set of intermediate voltages by the switch circuit, and the second DAC is configured to output a second voltage range smaller than the first voltage range by taking a part of the plurality of sub-DACs as candidates to determine the selected set of intermediate voltages by the switch circuit.

16. The source driver of claim 15, wherein the interpolation circuit in the first DAC performs a k1-bit interpolation, and the interpolation circuit in the second DAC performs a k2-bit interpolation, wherein k2 is greater than k1.

17. The source driver of claim 1, further comprising a gamma voltage generation circuit, coupled to the first DAC and the second DAC and configured to generate a plurality of gamma voltages.

18. The source driver of claim 17, wherein the first DAC receives a plurality of first gamma voltages among the plurality of gamma voltages, and the second DAC receives a plurality of second gamma voltages among the plurality of gamma voltages, wherein the plurality of first gamma voltages are in a first range, and the plurality of second gamma voltages are in a second range different from the first range.

19. The source driver of claim 18, wherein the number of the plurality of first gamma voltages is different from the number of the plurality of second gamma voltages.

* * * * *